US011520922B2

United States Patent
Marlin et al.

(10) Patent No.: US 11,520,922 B2
(45) Date of Patent: Dec. 6, 2022

(54) METHOD FOR PERSONAL DATA ADMINISTRATION IN A MULTI-ACTOR ENVIRONMENT

(71) Applicants: Todd Jeremy Marlin, Park City, UT (US); Marisa A Marlin, Park City, UT (US)

(72) Inventors: Todd Jeremy Marlin, Park City, UT (US); Marisa A Marlin, Park City, UT (US)

(*) Notice: Subject to any disclaimer, the term of this patent is extended or adjusted under 35 U.S.C. 154(b) by 630 days.

(21) Appl. No.: 16/522,502

(22) Filed: Jul. 25, 2019

(65) Prior Publication Data

US 2019/0347442 A1     Nov. 14, 2019

Related U.S. Application Data

(63) Continuation-in-part of application No. 15/969,458, filed on May 2, 2018, now abandoned, and a
(Continued)

(51) Int. Cl.
*G06F 21/62* (2013.01)
*H04L 67/306* (2022.01)
(Continued)

(52) U.S. Cl.
CPC ...... *G06F 21/6245* (2013.01); *G06F 21/6254* (2013.01); *H04L 67/306* (2013.01);
(Continued)

(58) Field of Classification Search
CPC ............ G06F 21/6245; G06F 21/6254; H04W 12/02; G06Q 20/401; G06Q 30/0201; H04L 67/306
See application file for complete search history.

(56) References Cited

U.S. PATENT DOCUMENTS 6,196,459 B1   3/2001   Goman et al.
8,131,674 B2   3/2012   Arrouye et al.
(Continued)

FOREIGN PATENT DOCUMENTS

WO   WO2017120087 A1   7/2017

OTHER PUBLICATIONS

Debnath, M. K.; Samet, S.; and Vidyasankar, K.; "A secure revocable personal health record system with policy-based fine-grained access control," 2015 13th Annual Conference on Privacy, Security and Trust (PST), 2015, pp. 109-116, doi: 10.1109/PST.2015.7232961.*

(Continued)

*Primary Examiner* — Victor Lesniewski

(57) ABSTRACT

A method for personal data administration in a multi-actor environment is performed by a system that includes a data management process managed by a remote server. The system includes a user profile that is associated to a user PC device and includes a set of data management protocols and a user data registry. The system also includes a third-party account that is associated to an account ID and a third-party data registry. The method begins when a data transmission notification is received by the remote server. The remote server analyzes the notification to select an appropriate protocol from the data management protocols. The method then executes the data management protocol, makes a record of the interaction, and transmits an outgoing data packet to the third-party account. The method then monitors the outgoing data packet to determine if the user data contained therein has been transferred interacted or tampered with.

12 Claims, 18 Drawing Sheets

Related U.S. Application Data continuation-in-part of application No. 15/969,482, filed on May 2, 2018, now Pat. No. 10,375,187.

(60) Provisional application No. 62/743,840, filed on Oct. 10, 2018, provisional application No. 62/620,257, filed on Jan. 22, 2018, provisional application No. 62/620,645, filed on Jan. 23, 2018, provisional application No. 62/676,782, filed on May 25, 2018.

(51) Int. Cl.
*H04W 12/02* (2009.01)
*G06Q 20/40* (2012.01)
*G06Q 30/02* (2012.01)

(52) U.S. Cl.
CPC .......... *H04W 12/02* (2013.01); *G06Q 20/401* (2013.01); *G06Q 30/0201* (2013.01)

(56) References Cited

U.S. PATENT DOCUMENTS

| | | |
|---|---|---|
| 10,375,187 B1 | 8/2019 | Marlin |
| 10,515,212 B1* | 12/2019 | McClintock ............ G06F 21/57 |
| 11,238,176 B1* | 2/2022 | Vax ........................ G06F 16/904 |
| 2002/0073066 A1* | 6/2002 | Coutts ..................... G06Q 30/06 |
| 2006/0149706 A1 | 7/2006 | Prang et al. |
| 2006/0212713 A1* | 9/2006 | Hatakeda ............ G06F 21/6245 713/182 |
| 2010/0185871 A1* | 7/2010 | Scherrer ............. G06F 21/6218 726/4 |
| 2011/0161172 A1* | 6/2011 | Lee ....................... H04L 67/025 709/224 |
| 2011/0185016 A1 | 7/2011 | Kandasamy et al. |
| 2011/0238482 A1* | 9/2011 | Carney ............... G06F 21/6245 707/754 |
| 2012/0331567 A1* | 12/2012 | Shelton .................. G06Q 10/00 726/28 |
| 2013/0318199 A1* | 11/2013 | Le Jouan ............ H04L 63/0421 709/217 |
| 2014/0143886 A1* | 5/2014 | Eversoll ............. G06F 21/6218 726/27 |
| 2014/0215638 A1* | 7/2014 | Nicolas ............... G06F 21/6272 726/27 |
| 2014/0372228 A1* | 12/2014 | Paz-Pujalt .......... G06Q 30/0271 705/14.67 |
| 2016/0359828 A1* | 12/2016 | Thormaehlen ........ H04W 12/02 |
| 2017/0249478 A1* | 8/2017 | Lovin ..................... G06Q 10/00 |
| 2017/0295206 A1* | 10/2017 | Feiertag .............. H04L 63/1425 |
| 2018/0054456 A1 | 2/2018 | Ground et al. |
| 2018/0329940 A1* | 11/2018 | Tiku .................... G06F 21/6245 |
| 2019/0012471 A1* | 1/2019 | Garcia .................. G06F 21/604 |
| 2019/0034808 A1* | 1/2019 | Palanichamy ......... G06N 5/022 |

OTHER PUBLICATIONS

Roy Solberg, Data Counter Widget—usage, https://play.google.com/store/apps/details?id=com.roysolberg.android.datacounter&hl=en_US, May 11, 2018.

* cited by examiner

METHOD FOR PERSONAL DATA ADMINISTRATION IN A MULTI-ACTOR ENVIRONMENT

FIELD OF THE INVENTION

The present invention generally relates data processing. More specifically the present disclosure relates to a method and a system for implementing a data monitoring system that operates on digital devices including but not limited to cell phones, tablets, gaming systems, computers

BACKGROUND OF THE INVENTION

As technology develops people continuously seek methods to improve the quality of life. Advanced computer systems are now replacing tasks that were previously performed by humans. Furthermore, the widespread internet access has allowed for advanced technological advancements in most aspects of life. The internet of things (IoT) is defined as the network of physical devices that include connectivity features. Most modern physical devices comprise a computing system that allow for the collection and exchange of data. The IoT allows for physical objects to be controlled via an extensive and accessible universal network. The flow of data between, users, devices, and software is at the basis for automated systems as we know them today. Connectivity and the transfer of the data is crucial for existing technologies. People are able to share data instantaneously like never before. As the amount and type of data transmitted continuously increase, various issues arise including but not limited to cybersecurity, and monetization. Numerous applications are available for users, and data of various types is transmitted at every second. As such, there is an additional risk of compromising privacy. Personal information pertaining to identity, financial credential, or medical records, may possibly be captured and stored by unauthorized computational systems. Currently data has a pivotal role in society, by proving to be the link between users, services, and companies.

Computers have become an integral part of human life. More recently, data can be monetized using various channels, and it is not uncommon for third parties to collected data from unsuspecting users which ends up being exploited for very lucrative financial gain with no gain for the user whatsoever. In retrospect data can be viewed as a new form of currency. However, while currency is strictly regulated, there are no explicit methods or regulations for users to control the data shared over the internet. As an example, social media provides numerous platforms for users to share experiences and preferences. Third parties can collect the data transmitted from the user to the social media platform, which may be monetized for advertisement proposes to target specific groups. In addition, data may be used in unethical scopes by various entities that have unscrupulous interests. Currently, users do not have access to the collected data, and there is no control over the distribution. Therefore if the data ends up in the wrongs hands, the user has no way of knowing who sees their data, where the data is sent, and the scope in which it may be used.

As such there is an increased need for an automated system that allows users to obtain control of the data they create, in every aspect, including if the data is submitted to a third party, or if the data is collected involuntarily without the user's notice.

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method to monitor the creation of data related to the user and whether the data created purposely or involuntarily, is submitted and/or collected by a third party is disclosed. The present invention, may be implemented on a variety of electronic devices, including but not limited to a desktop computer, a portable computer, and virtually any IOT device or internet connected device. An online platform may further provide an application where users can manage the collected data. In addition, the application may allow users to access data transaction records and monitor all activity that pertains to their personal collected data. As such users, may approve or deny certain transactions.

Further, the method may include a step of logging user generated data, using the widget card with an associated unique identification document. Moreover, the widget card is configured specifically to each user and their specifications as well as the user's individual device.

The disclosed methods, application, and system operate on digital devices providing a mechanism, for implementing customized data tracking, that allows users to monitor the data generated when using personal device, services, and software. Alternatively, in cases where the data is mismanaged or intercepted by unauthorized third parties, the user has the option to revoke or disable a transaction.

In further embodiments, a company may employ the concepts present herein to integrate an embedded element that contain an identifying marker. The marker is able to track where, when, and by whom the collected data may be used.

In addition, the system in combination with the optional widget card is also useful for companies that provide the collected data to customers, employees, or other business, and which implement policies designed to limit, how, where and when the data is used. Currently, there is no mechanism of control available for companies that want to ensure that the data is used only for intended purposes. The present invention aims to solve some of the problems mentioned above by integrating a wrapper which is included with the data set as a whole. The wrapper would prevent unwanted tampering with the data, by limiting the where the data can be stored, how it accessed and used. If the wrapper is tampered with, it automatically alerts the data owner and locks out usage until the transaction is either approved or rejected by the owner. The data can also be remotely wiped if it receives a command to do so from the data owner.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

FIG. 2b is a flowchart illustrating the overall method of the present invention as continued from FIG. 2a.

FIG. 5b is a flowchart illustrating the sub-process for identifying the appropriate protocol using the method of the present invention as continued from FIG. 5a.

FIG. 12b is a flowchart illustrating the sub-process for executing the multi-party deletion process using the method of the present invention as continued from FIG. 12a.

DETAIL DESCRIPTIONS OF THE INVENTION

All illustrations of the drawings are for the purpose of describing selected versions of the present invention and are not intended to limit the scope of the present invention.

Referring to FIG. 1 through FIG. 15, the present invention, the method for personal data administration in a multi-actor environment, is a method designed to give a user control over how user-generated data is stored, transmitted, and interacted with by one or more external entities. The present invention is designed to function as an intermediary data management system that monitors all user data being generated by one or more electronic devices that are under the control of the user. For example, the method of the present invention is designed to monitor and manage all the data generated by a user's smartphone, fitness tracker, and personal computer. The present invention is also designed to manage the data interactions for a host internet of things (IoT) devices that are controlled by, or associated to, the user. Additionally, the present invention is designed to act as a data management system that implements specific protocols to manage a user's data. For example, the present invention is designed to assign a monetary value to specific pieces of user data. The present invention then compels the external entity to pay the user for access to any specific piece of user data. The present invention is further designed to monitor the user data after being transferred to the external entity. As a result, the present invention is able to notify the user when the user data has been transferred to a new entity or accessed by an unauthorized entity. Further, the present invention is designed to compel the new entity to pay the user for access to the transferred data. The present invention enables the user to manage how the user data is stored, transferred, and interacted with. For example, the user is able to delete specific pieces of user data that are stored on the systems of external entities, if contractual agreements are not adhered to.

Figure 1:
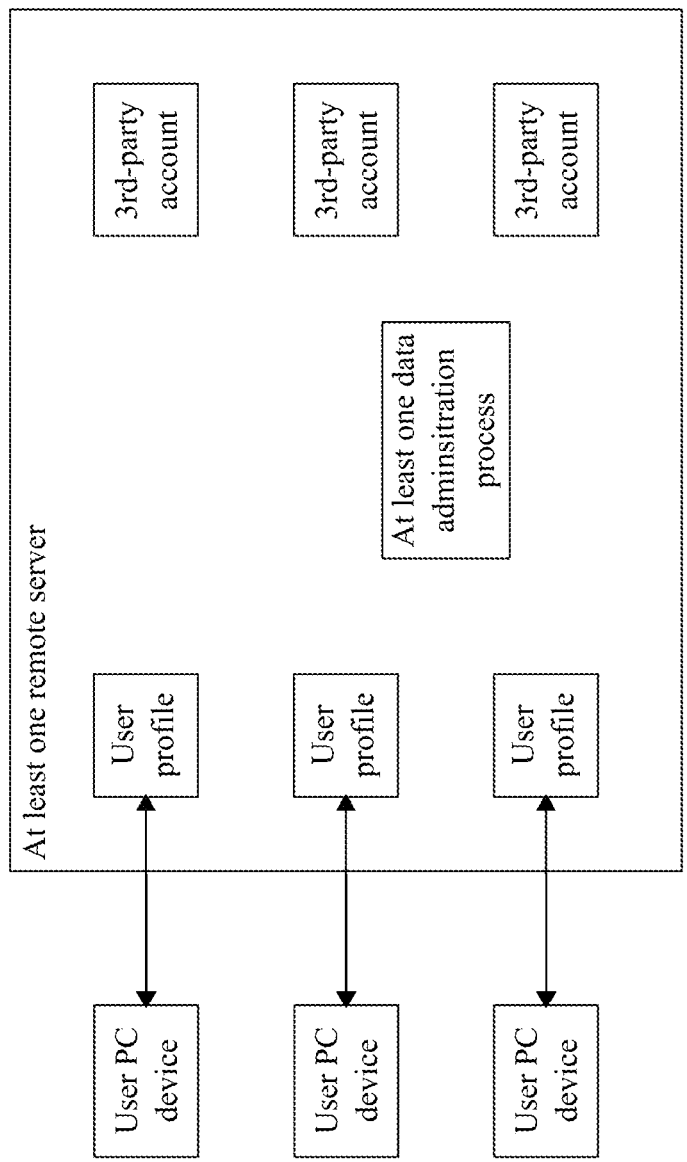
FIG. 1 is a system diagram of the present invention.
Figure 2A:
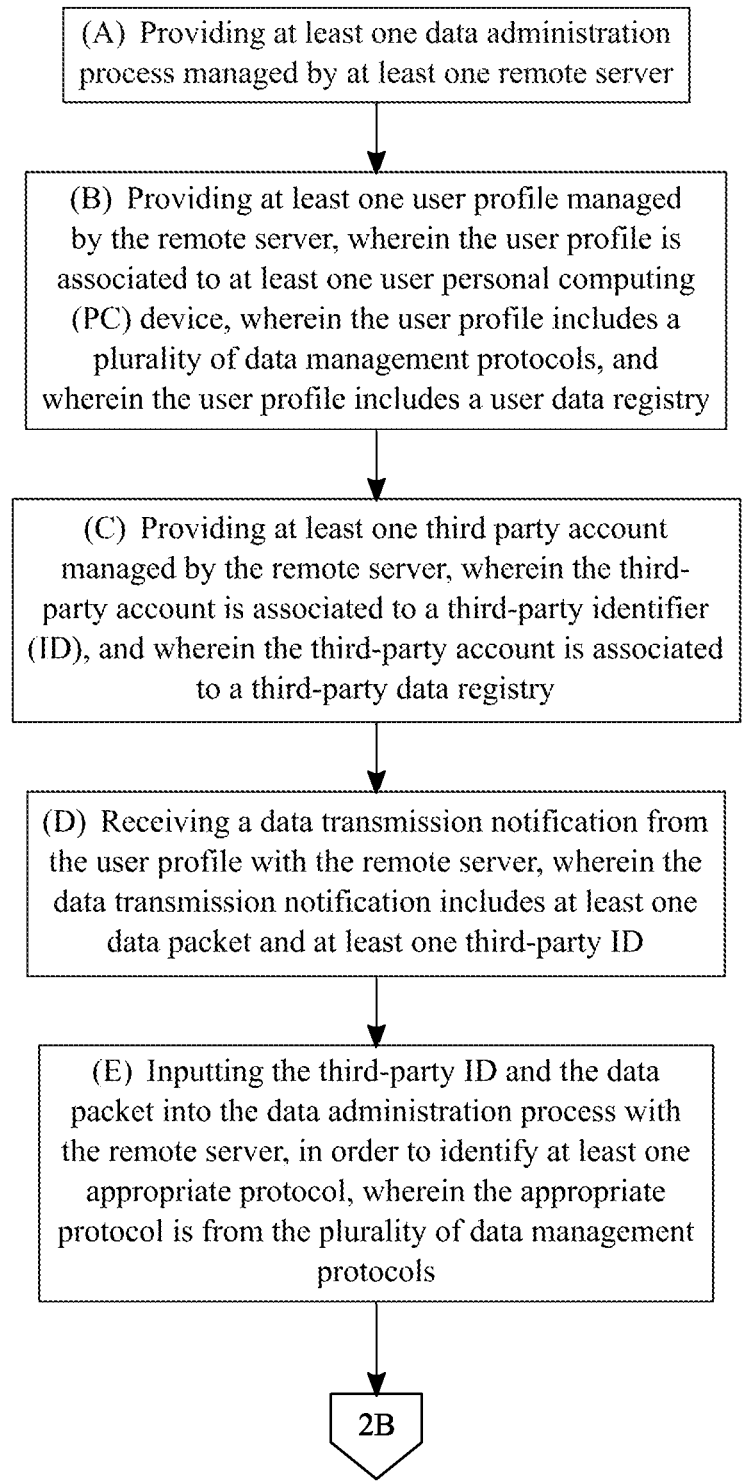
FIG. 2a is a flowchart illustrating the overall method of the present invention.
Figure 2B:
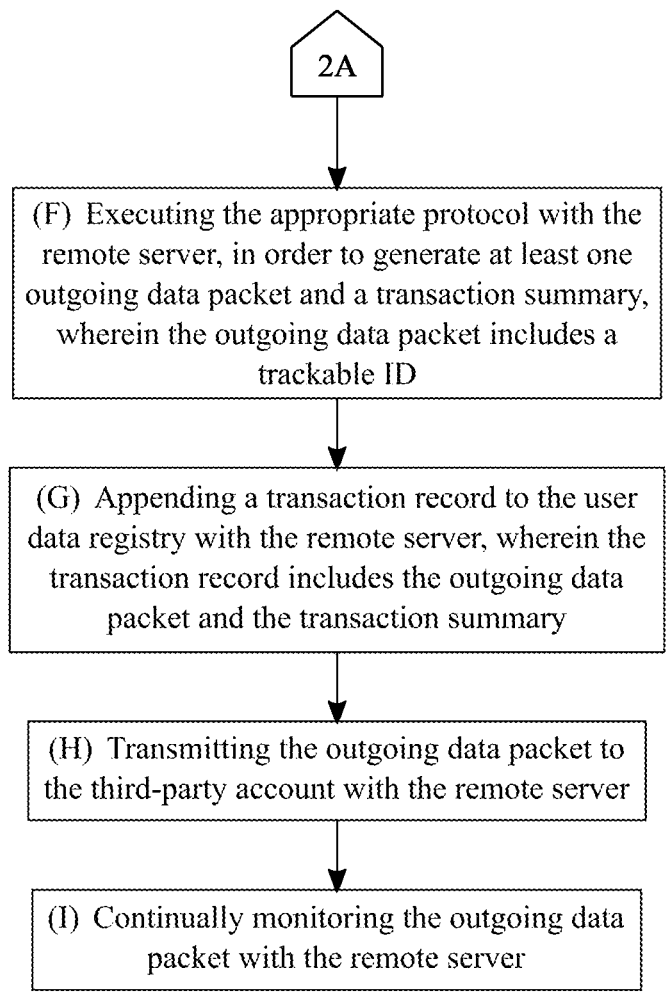

Referring to FIG. 1 through FIG. 2b, to accomplish the above-described functionalities, the system used to execute the method of the present invention begins by providing at least one data administration process managed by at least one remote server (Step A). The data administration process is a routine that analyzes the specific piece of user data being transferred and the intended recipient of said data to determine an appropriate subroutine to execute. The appropriate subroutine may perform actions including, but not limited to requesting the external entity pay for access to the specific piece of data, embedding the specific piece of data into a trackable packet that can be monitored by the remote server, regardless of the external entity with whom the specific piece of data currently resides, and notifying the user of a data request by the unauthorized entity. Continuing on, the system used to execute the method of the present invention further provides at least one user profile managed by the remote server (Step B). The user profile is tied to a unique individual and is associated with at least one user personal computing (PC) device. The user PC devices used to interact with the present invention can be, but is not limited to, a smartphone, a laptop, a desktop, or a tablet PC. Additionally, the at least one user PC device may refer to a distributed network of computing devices and IoT systems. The remote server is used to facilitate transferring data between the user PC device and any external entity. Moreover, the remote server is used to execute a number of internal processes for the present invention. The user profile includes a plurality of data management protocols and is associated to a user data registry. Each of the plurality of data management protocols is a subroutine that describes the steps the method of the present invention will execute when transferring or allowing access to user data. Preferably, the user defines the steps for a subset of the plurality of data management protocols. An additional subset of the plurality of data management protocols may be sourced from external entities. Additionally, each of the plurality of data management protocols is designed to implement best practices for data management and security. The user data registry is a repository containing information about all data transactions performed between the user profile and the external entity. Continuing on, the system used to execute the method of the present invention further provides at least one third party account managed by the remote server. The third-part account refers to a digital record of the external entity and is associated to a third-party identifier (ID), and a third-party data registry (Step C). Further, the third-party account contains the requisite information for contacting and communicating with the external entity.

Now that the system used to execute the method of the present invention has been described, it is possible to adequately describe the steps that are executed for the method. The overall method of the present invention begins by receiving a data transmission notification from the user profile with the remote server (Step D). The remote server remains on standby, performing other tasks, until the user PC device attempts to transmit data to the external entity. This attempt is signified by the transmission of the data transmission notification from the user PC device with the remote server. The data transmission notification includes at least one data packet and at least one third-party ID. The term "data packet" is used herein to refer to various forms of information including, but not limited to protected health data, location data, metadata, and behavioral data. The overall method of the present invention continues by inputting the third-party ID and the data packet into the data administration process with the remote server, in order to identify at least one appropriate protocol (Step E). The method of the present invention is designed to act as a buffer layer that analyzes the type of user data being transmitted by the user PC device in relation to the intended recipient of the user data to identify the steps required to execute a data transaction. The appropriate protocol is from the plurality of data management protocols and outlines the subroutine that will be executed to either block or allow the data packet to be transmitted to the third-party account associated to the third-party ID included in the data transmission notification.

Once the appropriate protocol has been identified, the overall method of the present invention is used to execute the appropriate protocol and then generate a record of the transaction. To that end, the overall method of the present invention continues by executing the appropriate protocol with the remote server, in order to generate at least one outgoing data packet and a transaction summary (Step F). The outgoing data packet is a formatted piece of data that includes a trackable ID that enables the outgoing data packet to be monitored and controlled by the remote server. Specifically, the data packet is formatted into the outgoing data packet by integrating a control wrapper into the data packet to prevent unwanted tampering with the data. Further the wrapper endures all contractual agreements are adhered to by limiting where the outgoing data packet can be stored and how the outgoing data packet accessed or used. If the wrapper is tampered with, it automatically alerts the data owner and locks out usage until the transaction is either approved or rejected by the owner. The transaction summary contains information relevant to the outgoing data packet including, but not limited to, metadata, third-party ID, date and time of transaction, and the monetary value of the transaction. The overall method of the present invention continues by appending a transaction record to the user data registry with the remote server (Step G). The transaction record contains all relevant information associated to a discrete data transaction including, but not limited to the outgoing data packet and the transaction summary. The transaction record is appended to an entry in the data registry that is unique to the outgoing data packet and can be identified by the trackable ID. Thus, the method of the present invention enables the user to view the complete transaction history of one or more outgoing data packets by browsing the data registry.

The method of the present invention is designed to mediate the flow of data between the user PC device and the external entity. To that end, the overall method of the present invention continues by transmitting the outgoing data packet to the third-party account with the remote server (Step H). Depending on the appropriate protocol executed during Step F, the outgoing data packet may comprise various types of user data including, but not limited to, raw user data, a response denying access to the user data, or nothing at all, The overall method of the present invention continues by continually monitoring the outgoing data packet with the remote server (Step I). Accordingly, the overall method of the present invention functions as an active system that monitors the user data that has been transmitted to the external entity. Further, the method of the present invention is designed to execute a plurality of sub-processes in response to different events. For example, the method of the present invention is designed to detect that an unauthorized third party is attempting to access the specific piece of user data stored in the third-party data registry of the external entity. Upon identifying such an event, the method of the present invention is designed to execute a theft management sub-process to prevent the unauthorized access and alert the user.

Figure 3:
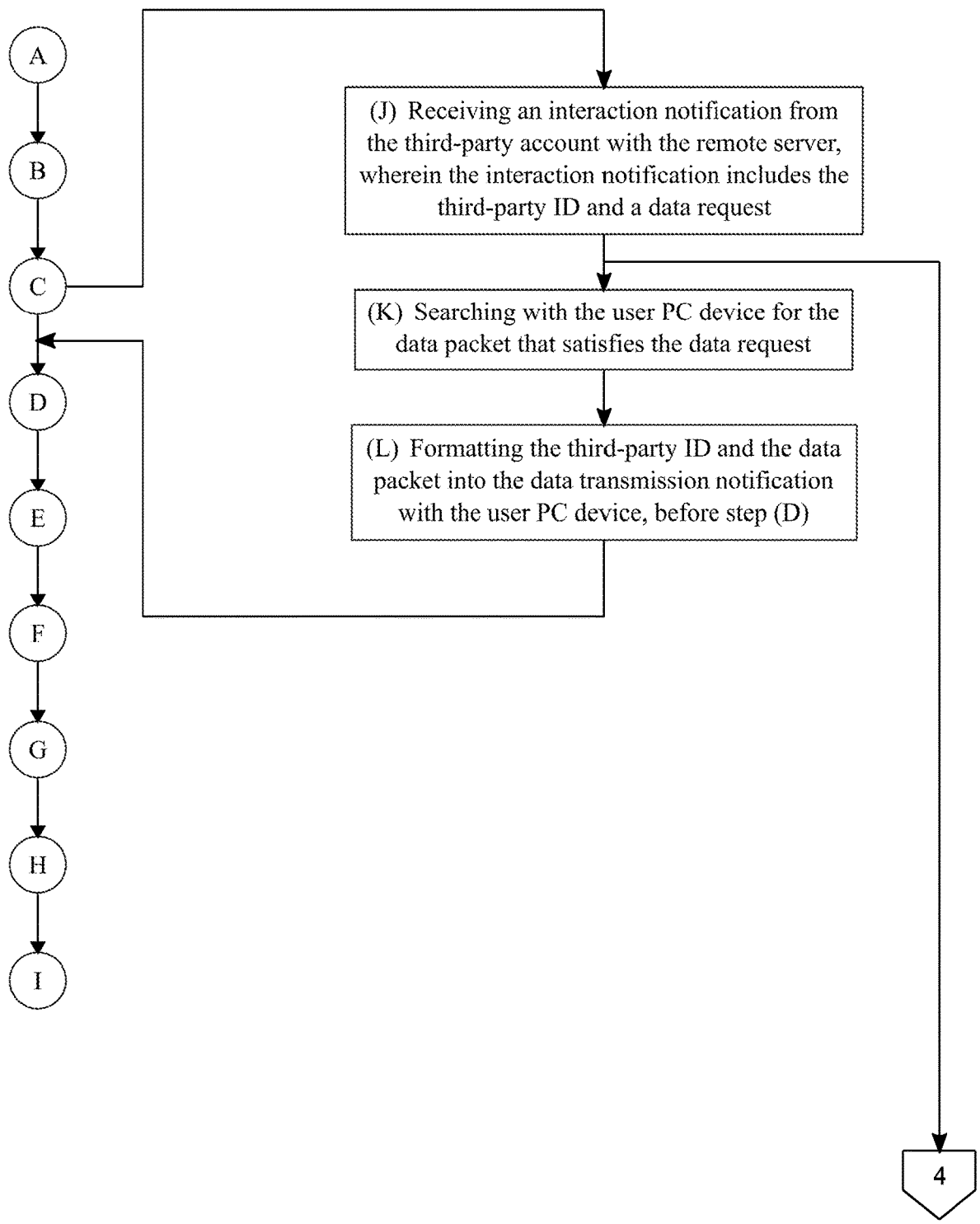
FIG. 3 is flowchart illustrating a sub-process for responding to a data request using the method of the present invention.

Referring to FIG. 3, the method of the present invention is designed to act as a threat mitigation system for the user's data. To that end, the method includes a sub-process for mediating data requests that are sent from the external entity to the user PC device. This sub-process begins by receiving an interaction notification from the third-party account with the remote server (Step J). The interaction notification is a request to access or interact with a desired piece of data stored on the user PC device and includes the third-party ID and a data request. The request mediation sub-process continues by searching with the user PC device for the data packet that satisfies the data request (Step K). In a supplemental embodiment, the remote server searches through the user data associated with a distributed network of IoT systems to satisfy the data request. Further, the user data required to satisfy the data request may be a statistical representation of the data gathered from a plurality of user PC devices. The request mediation sub-process concludes by formatting the third-party ID and the data packet into the data transmission notification with the user PC device, before Step D (Step L). Accordingly, the method of the present invention is able to vet any request for data interaction before allowing the user PC device to transmit the requested data.

Figure 4:
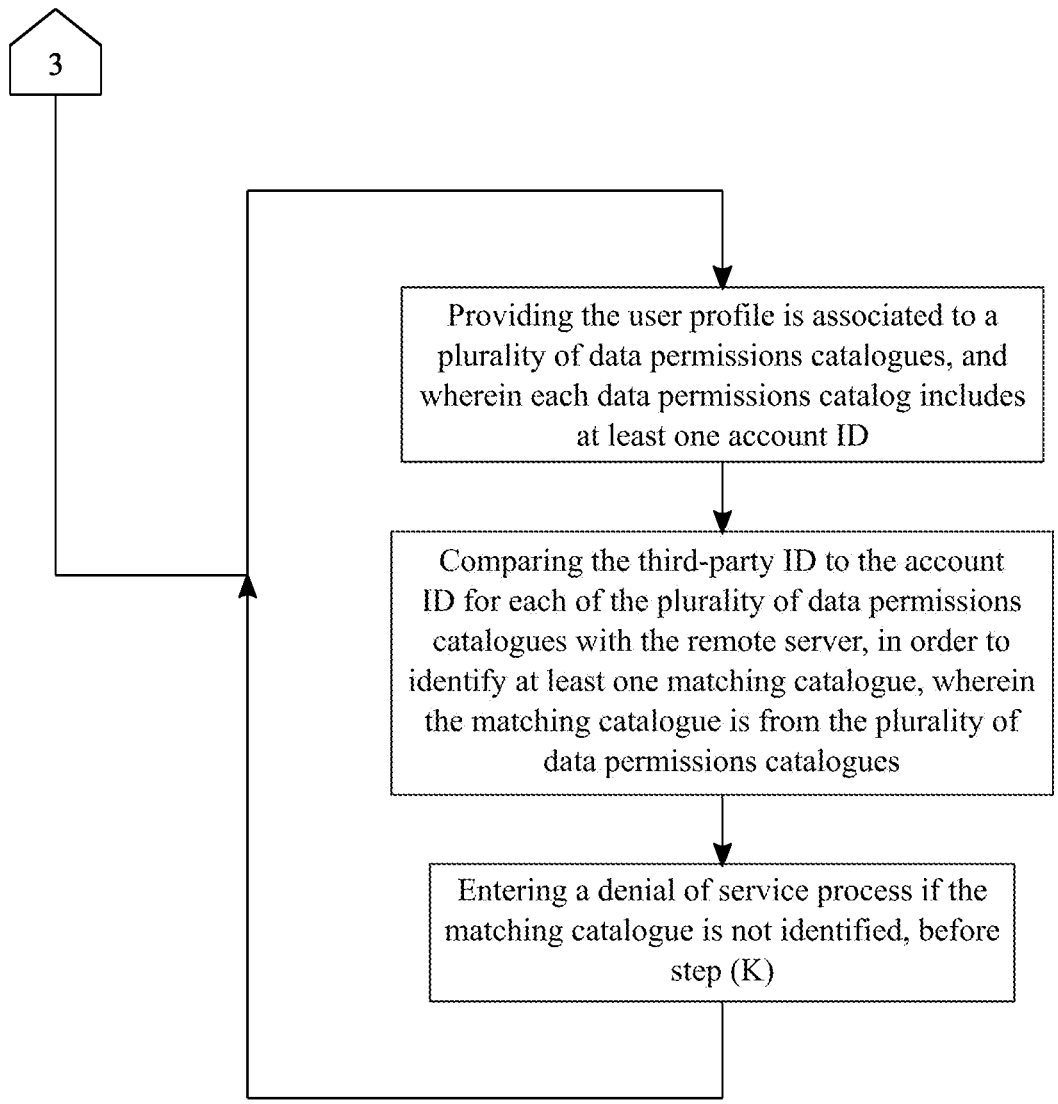
FIG. 4 is flowchart illustrating a sub-process for authenticating a third-party account using the method of the present invention.

Referring to FIG. 4, the request mediation sub-process is designed to authenticate the external entity's credentials before allowing the user PC device to transmit the requested piece of data. To achieve this functionality, the method of the present invention includes a third-party authentication sub-routine. The system used to execute the third-party authentication sub-routine provides a plurality of data permissions catalogues associated to the user profile. Each of the plurality of data permission catalogues includes at least one account ID and describes the actions that the third-party account is able to perform when attempting to interact with the user data. The cub-routine continues by comparing the third-party ID to the account ID for each of the plurality of data permissions catalogues with the remote server, in order to identify at least one matching catalogue from the plurality of data permissions catalogues. Accordingly, the sub-routine determines if the third-party account is permitted to access the data packet that satisfies the data request. The sub-process continues by entering a denial of service process if the matching catalogue is not identified, before Step K. Thus, the method of the present invention is able to prevent unauthorized external entities from sending data requests directly to the user PC device and potentially accessing previously unknown attack vectors for nefarious activity. The denial of service process may perform actions including, but not limited to, notifying the user, notifying law enforcement personnel, and executing a theft remediation protocol.

Figure 5A:
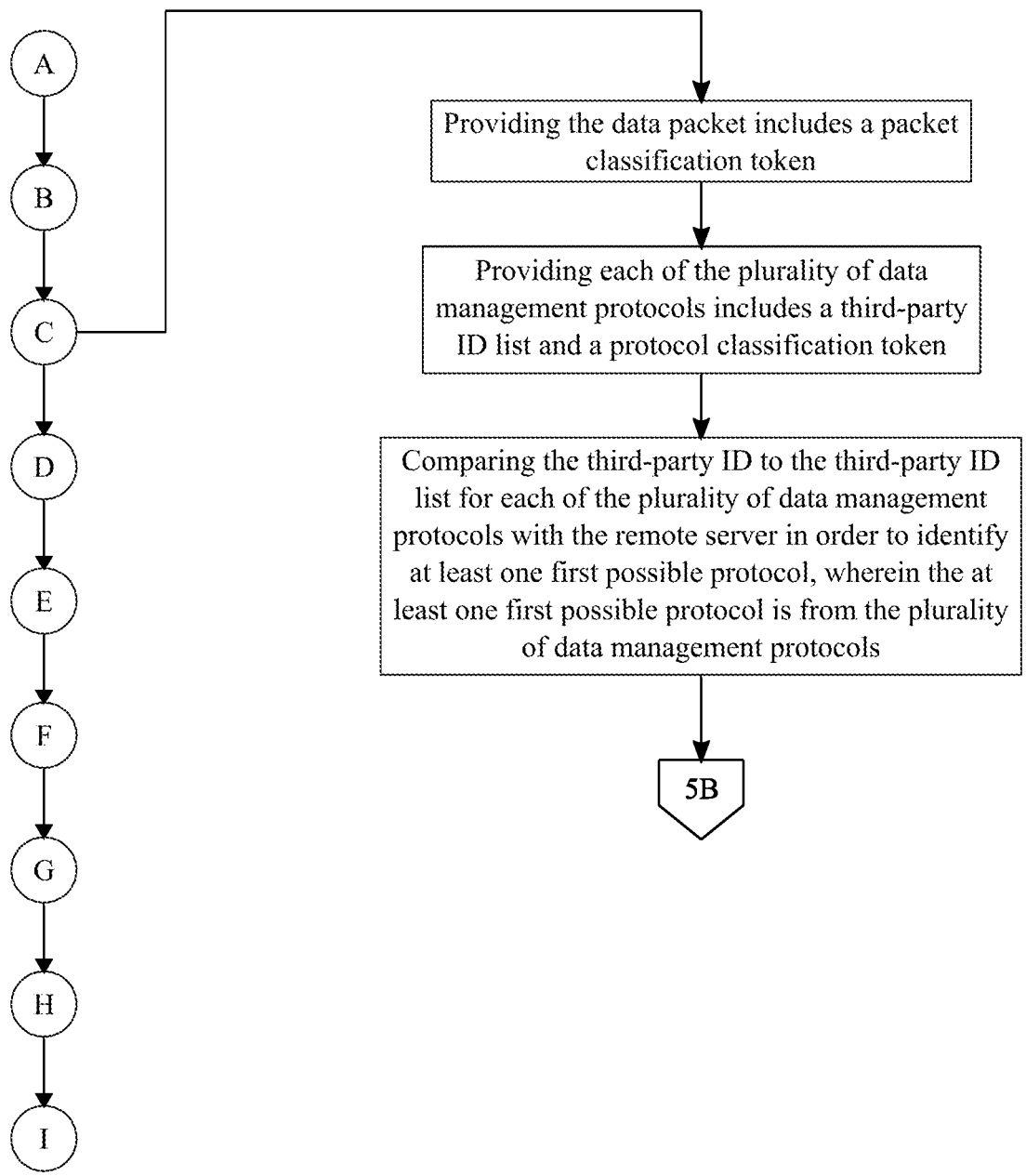
FIG. 5a is flowchart illustrating a sub-process for identifying an appropriate protocol using the method of the present invention.
Figure 5B:
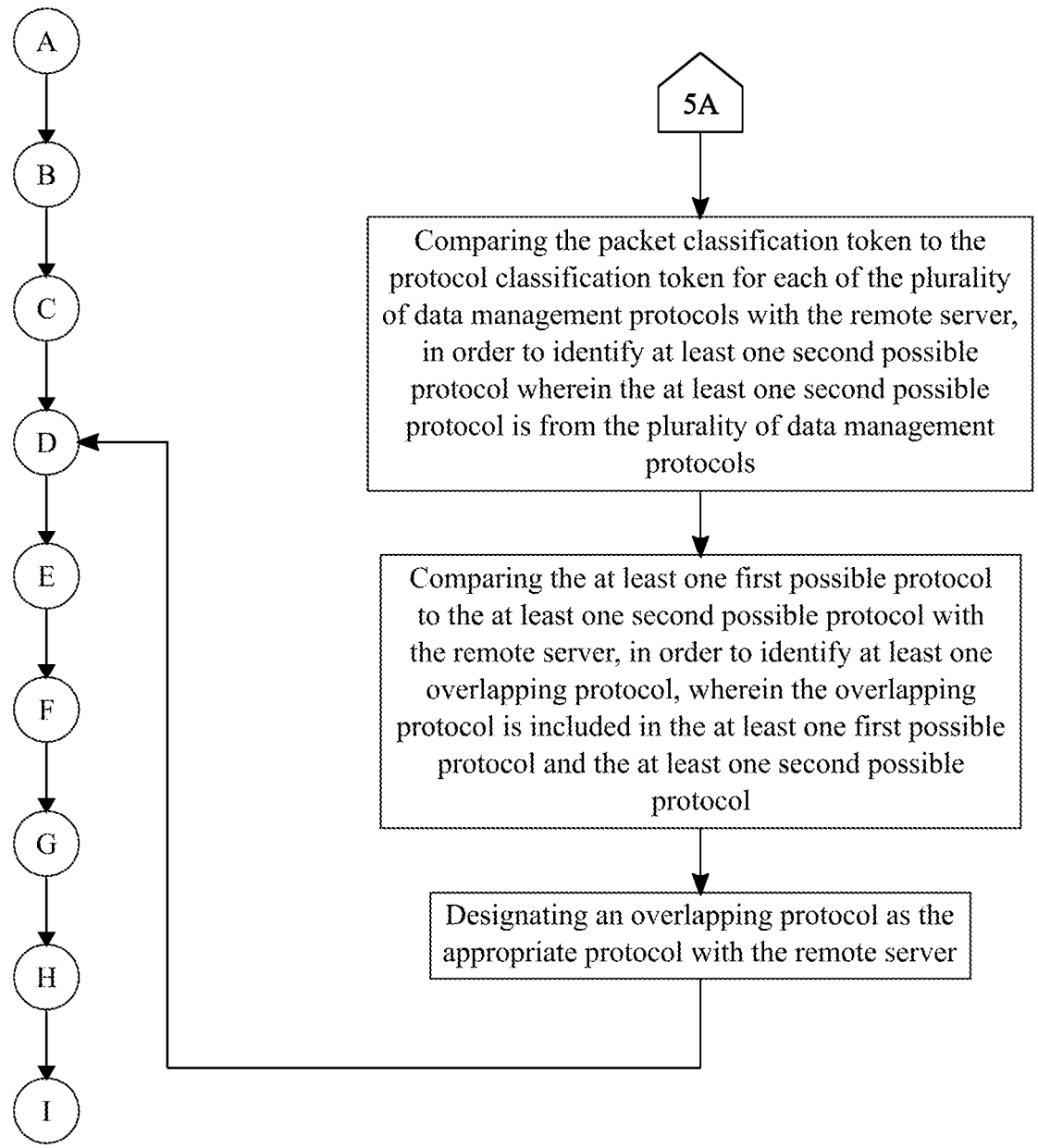

Referring to FIG. 5a through FIG. 5b, the method of the present invention is designed sift through the plurality of data management protocols to identify the correct course of action to take when presented with the option to send or receive user data to the external entity. To achieve this functionality, the method of the present invention employs the data administration process. The system for executing the data administration process begins by providing a packet classification token for the data packet. The packet classification token is a metadata tag used to identify the type of data contained within the data packet being sent to the remote server. Additionally, the system for executing the data administration process provides a third-party ID list and a protocol classification token for each of the plurality of data management protocols. The third-party ID list identifies the third-party accounts for whom a specific data management protocol would be considered the appropriate protocol. The protocol classification token is a metadata tag used to identify the types of user data upon which the execution of a specific data management protocol would be considered the appropriate protocol. The data administration process begins by comparing the third-party ID to the third-party ID list for each of the plurality of data management protocols with the remote server in order to identify at least one first possible protocol from the plurality of data management protocols. Thus, the data administration process determines if there are any third-party account specific protocols that should be executed. For example, the data administration process may determine if the external entity should be subjected to the third-party authentication subroutine or if the external entity should be required to pay the user account for access to user data.

The data administration process continues by comparing the packet classification token to the protocol classification token for each of the plurality of data management protocols with the remote server, in order to identify at least one second possible protocol from the plurality of data management protocols. Accordingly, the data administration process determines if there are any data packet specific protocols that should be executed. For example, the data administration process may determine personally identifiable information should be removed from the data packet or if the data packet should be reformatted for transmission via a low-bandwidth network. The data administration process continues by comparing the at least one first possible protocol to the at least one second possible protocol with the remote server, in order to identify at least one overlapping protocol that is included in both the at least one first possible protocol and the at least one second possible protocol. The data administration process continues by designating an overlapping protocol as the appropriate protocol with the remote server. Consequently, the method of the present invention is able to identify the correct third-party account specific and data packet specific protocols to execute in response to either a data interaction notification received from the external entity, or a data transmission notification received from the user PC device.

Figure 6:
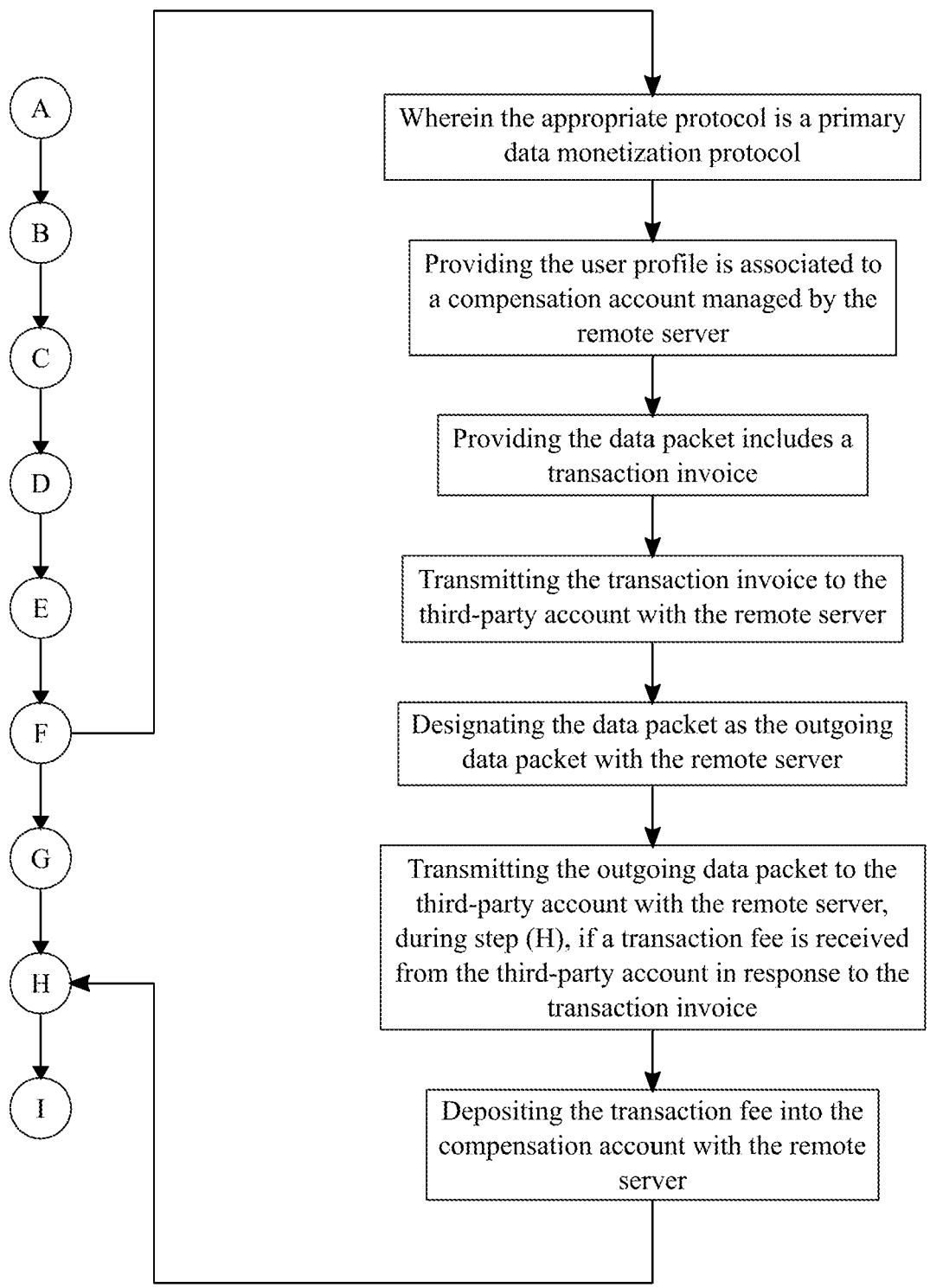
FIG. 6 is flowchart illustrating a sub-process for executing a primary data monetization protocol using the method of the present invention.

Referring to FIG. 6, the method of the present invention is designed to execute any number of data management protocols in response to data being sent to, or received by, the user profile. One example is when the appropriate protocol is a primary data monetization protocol. The primary data monetization protocol is designed to perform financial transactions that enable the external entity to access user data. The system for executing the primary data monetization protocol provides a compensation account that is managed by the remote server and associated to the user profile. The compensation account is used to receive and disburse compensation for access to user data. The term "compensation" is used herein to refer to anything that can be exchanged for access to the user data including, but not limited to, physical or digital currency, access to data, points, and stock options. Additionally, the system for executing the primary data monetization protocol provides a transaction invoice included in the data packet. The transaction invoice describes the compensation required to complete a data transaction. The primary data monetization protocol begins by transmitting the transaction invoice to the third-party account with the remote server. The primary data monetization protocol continues by designating the data packet as the outgoing data packet with the remote server. The primary data monetization protocol continues by transmitting the outgoing data packet to the third-party account with the remote server, during Step H, if a transaction fee is received from the third-party account in response to the transaction invoice. The primary data monetization process concludes by depositing the transaction fee into the compensation account with the remote server. As a result, the method of the present invention enables the user to be compensated for allowing the external entity to access or interact with the user data. Further putting the user in control of how the user data is interacted with by the external entity. Preferably, the user is able to set the cost of interaction and this cost can be updated depending on market rates and the user's needs.

Figure 7:
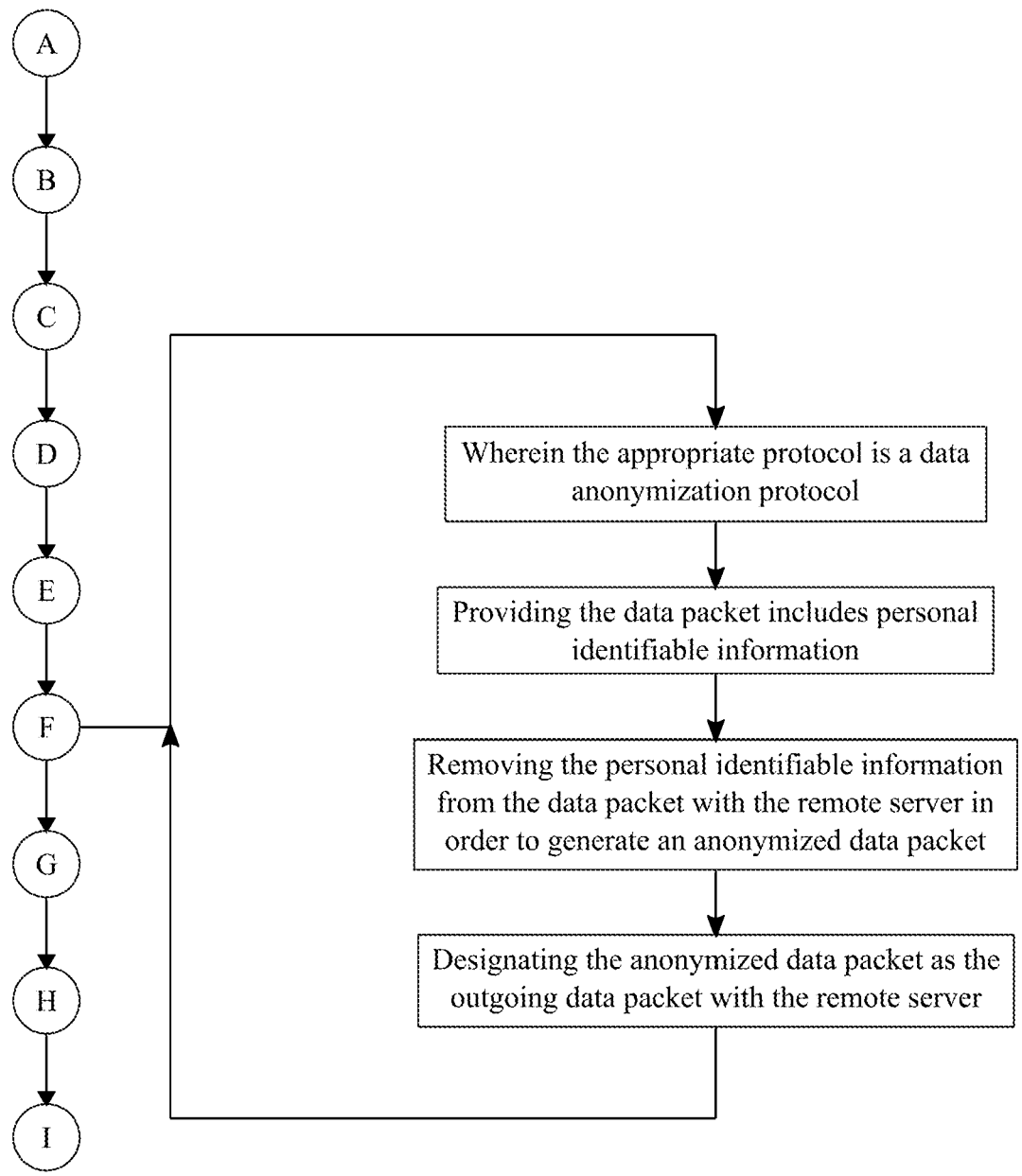
FIG. 7 is flowchart illustrating a sub-process for executing a data anonymization protocol using the method of the present invention.

Referring to FIG. 7, a separate sub-process is executed when the appropriate protocol is a data anonymization protocol. In some instances, the data packet includes personal identifiable information that should be removed prior to transmission. The method of the present invention executes the data anonymization protocol to perform such tasks. The data anonymization protocol begins by removing the personal identifiable information from the data packet with the remote server in order to generate an anonymized data packet. The data anonymization protocol concludes by designating the anonymized data packet as the outgoing data packet with the remote server. The anonymized data packet enables method of the present invention to send only process essential information to the external entity.

Figure 8:
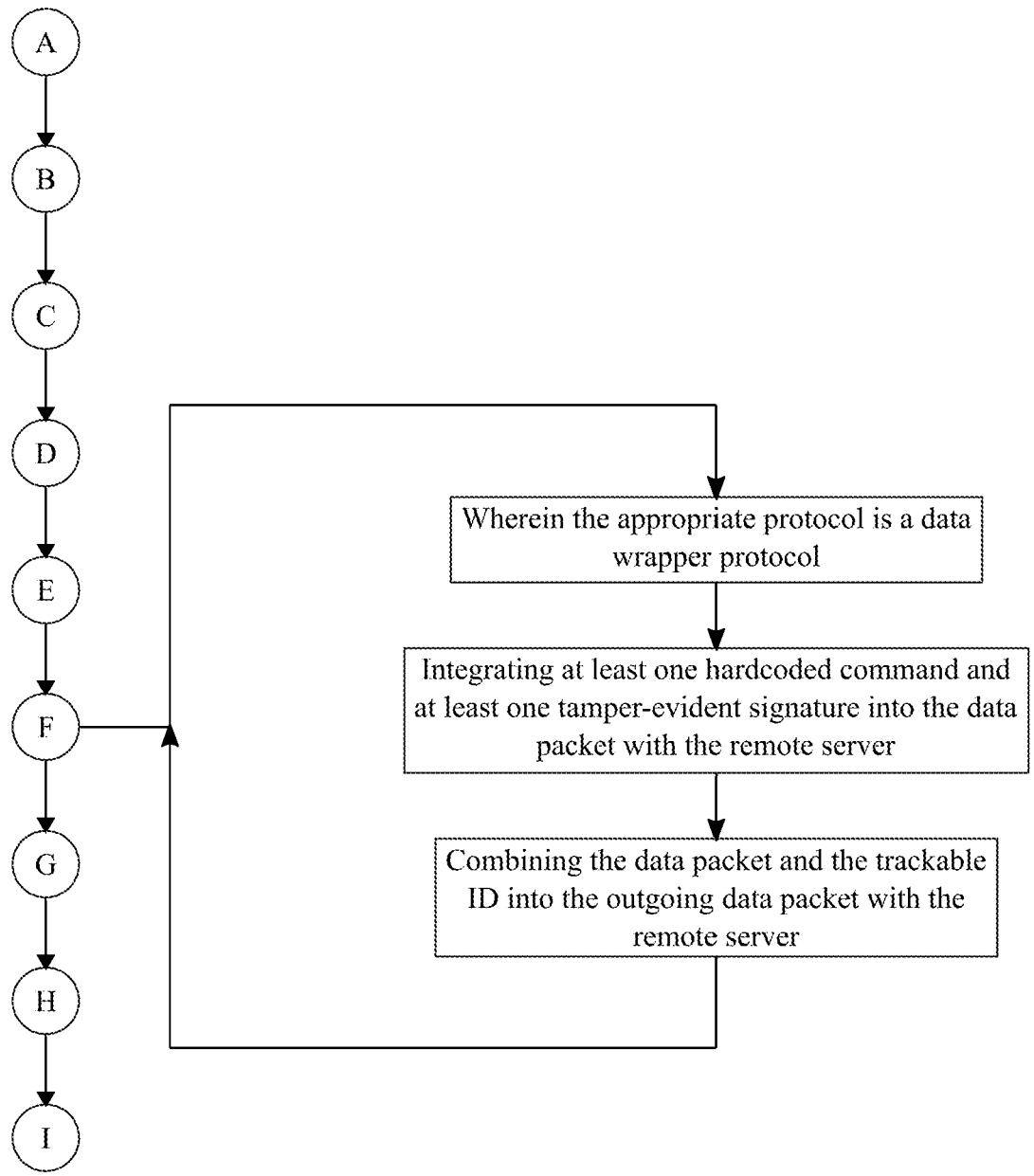
FIG. 8 is flowchart illustrating a sub-process for executing a data wrapper protocol using the method of the present invention.

Referring to FIG. 8, a separate sub-process is executed when the appropriate protocol is a data wrapper protocol. The data wrapper protocol is used to integrate snippets of code into the outgoing data packet so that the user is able to retain ultimate control of the user data that has been transferred to the external entity. The data wrapper protocol begins by integrating at least one hardcoded command and at least one tamper-evident signature into the data packet with the remote server. The hardcoded command is a snippet of code that cannot be extracted from the data packet without destroying the integrity of the remaining data contained within the data packet. Additionally, the hardcoded command is designed to be respond to commands issued by the user profile or by the remote server on behalf of the user. The data wrapper protocol concludes by combining the data packet and the trackable ID into the outgoing data packet with the remote server. Accordingly, the method of the present invention enables the user to retain control of user data regardless of where the user data is stored.

Figure 9:
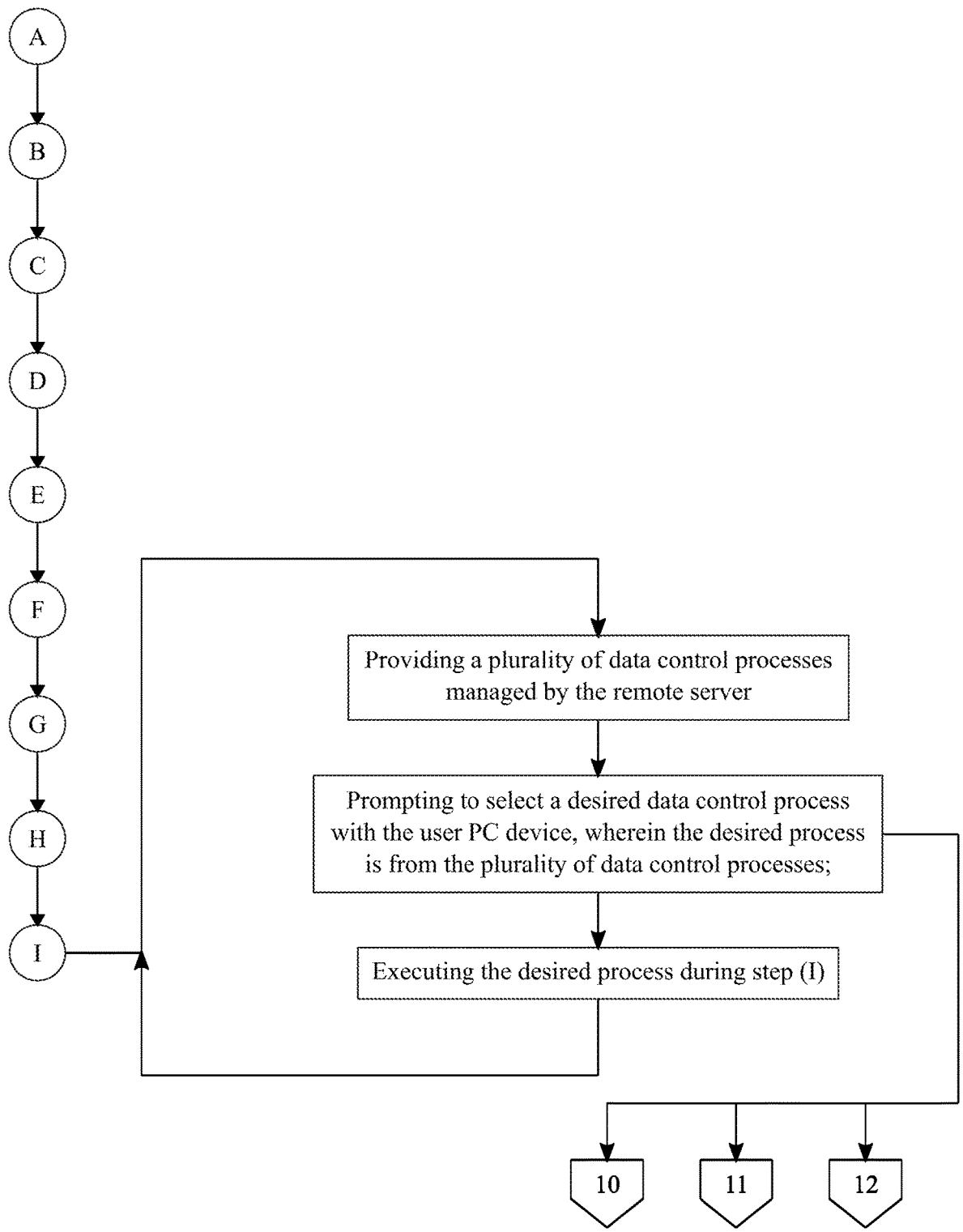
FIG. 9 is flowchart illustrating a sub-process for prompting the user to perform additional data control processes using the method of the present invention.

Referring to FIG. 9, the method of the present invention is designed to continually monitor the outgoing data packet once transferred to the third-party data registry. This monitoring is used to detect if the outgoing data packet has been tampered with, transferred, or interacted with in some way. Additionally, the method of the present invention is designed to enable the user to perform carious data manipulation tasks on the outgoing data packet throughout the time that the outgoing data packet exists within the third-party data registry. To that end, the system for executing the method of the present invention provides a plurality of data control processes managed by the remote server. Each of the plurality of data control processes is designed to enable the user to modify or interact with the outgoing data packet after transfer to the third-party data registry. The method of the present invention enables the user to initiate specific data control processes by prompting to select a desired data control process from the plurality of data control processes with the user PC device. The method of the present invention continues by executing the desired process during Step I. Accordingly, the present invention is able to perform the desired process at any time while the remote server is monitoring the outgoing data packet stored in the third-party data registry.

Figure 10:
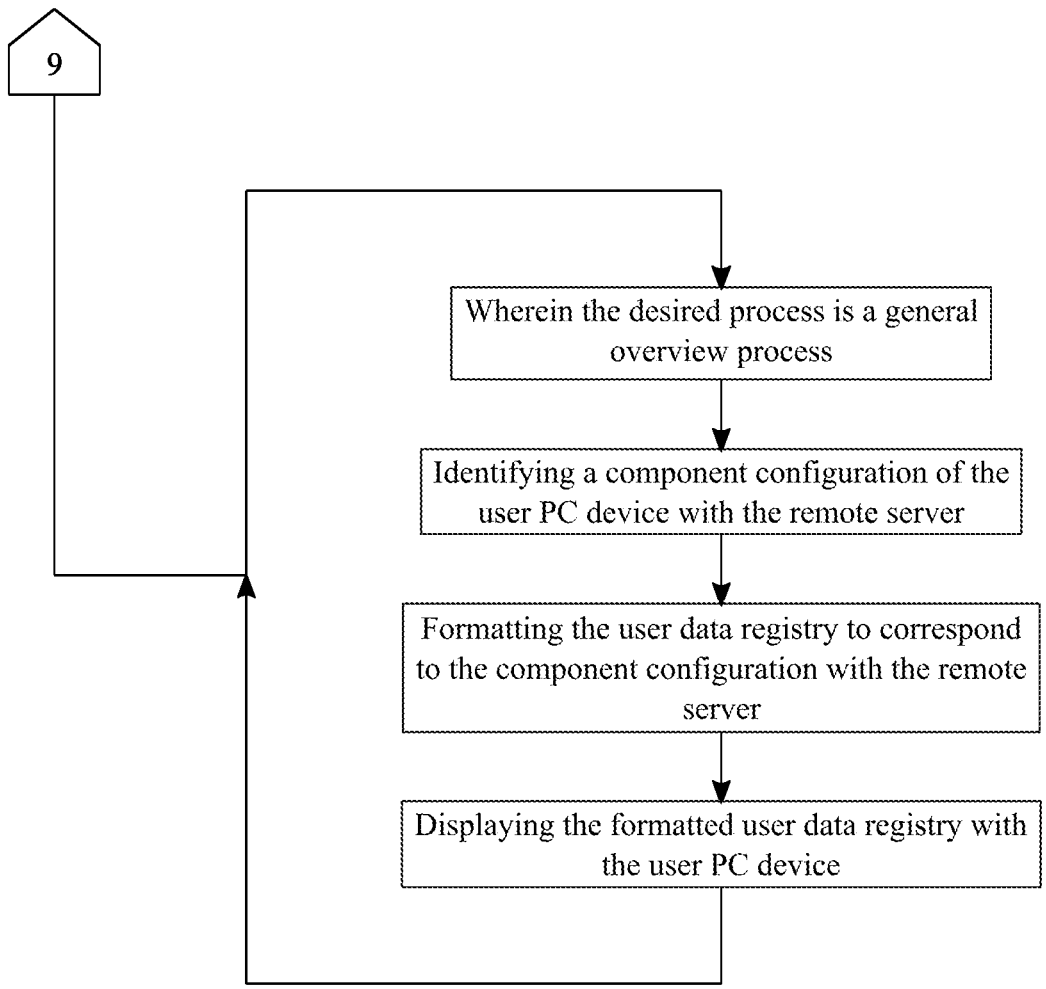
FIG. 10 is flowchart illustrating a sub-process for executing a general overview protocol using the method of the present invention.

Referring to FIG. 10, a separate sub-process is executed when the desired process is a general overview process. The general overview process is designed to output reports that visualize the transaction history for one or more outgoing data packets. The general overview process begins by identifying a component configuration of the user PC device with the remote server. The component configuration denotes the type of hardware and software contained within the user PC device. The general overview process continues by formatting the user data registry to correspond to the component configuration with the remote server. The general overview process continues by displaying the formatted user data registry with the user PC device. Accordingly, the present invention is designed to generate a user interface that is tailored to the type of user PC device the user is employing to access the method of the present invention. Further, the user is able to submit queries to search for the transaction history of a specific outgoing data packet. The general overview process further enables the user to view the history of the outgoing data packet over a user-defined time range.

Figure 11:
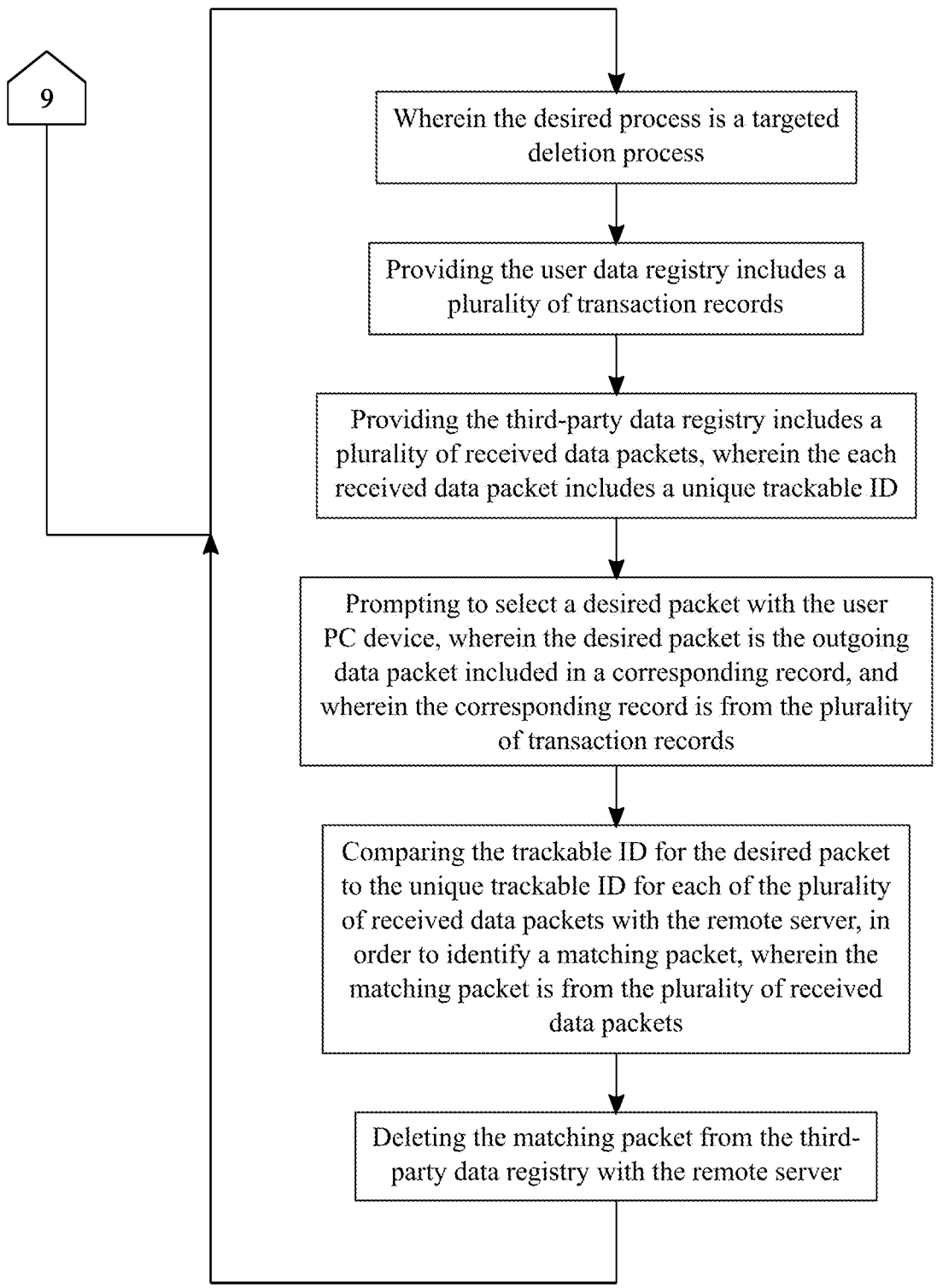
FIG. 11 is flowchart illustrating a sub-process for executing a targeted deletion process using the method of the present invention.

Referring to FIG. 11, a separate sub-process is executed when the desired process is a targeted deletion process. The targeted deletion process enables the user to delete user data stored in either the user data registry or the third-party data registry. Preferably, the user data registry includes a plurality of transaction records. The system for executing the targeted deletion process provides a plurality of received data packets included in the third-party data registry, where each received data packet includes a unique trackable ID. The targeted deletion process begins by prompting to select at least one desired packet with the user PC device. The user is given the option to select one or more outgoing data packets that have been transferred to the external entity and mark them for deletion. Specifically, desired packet is the outgoing data packet included in a corresponding record, where the corresponding record is from the plurality of transaction records. The targeted deletion process continues by comparing the trackable ID for the desired packet to the unique trackable ID for each of the plurality of received data packets with the remote server, in order to identify a matching packet from the plurality of received data packets stored in the third-party data registry. The targeted deletion process concludes by deleting the matching packet from the third-party data registry with the remote server. Accordingly, the user is given the freedom to delete user data regardless of the system on which the user data is stored.

Figure 12A:
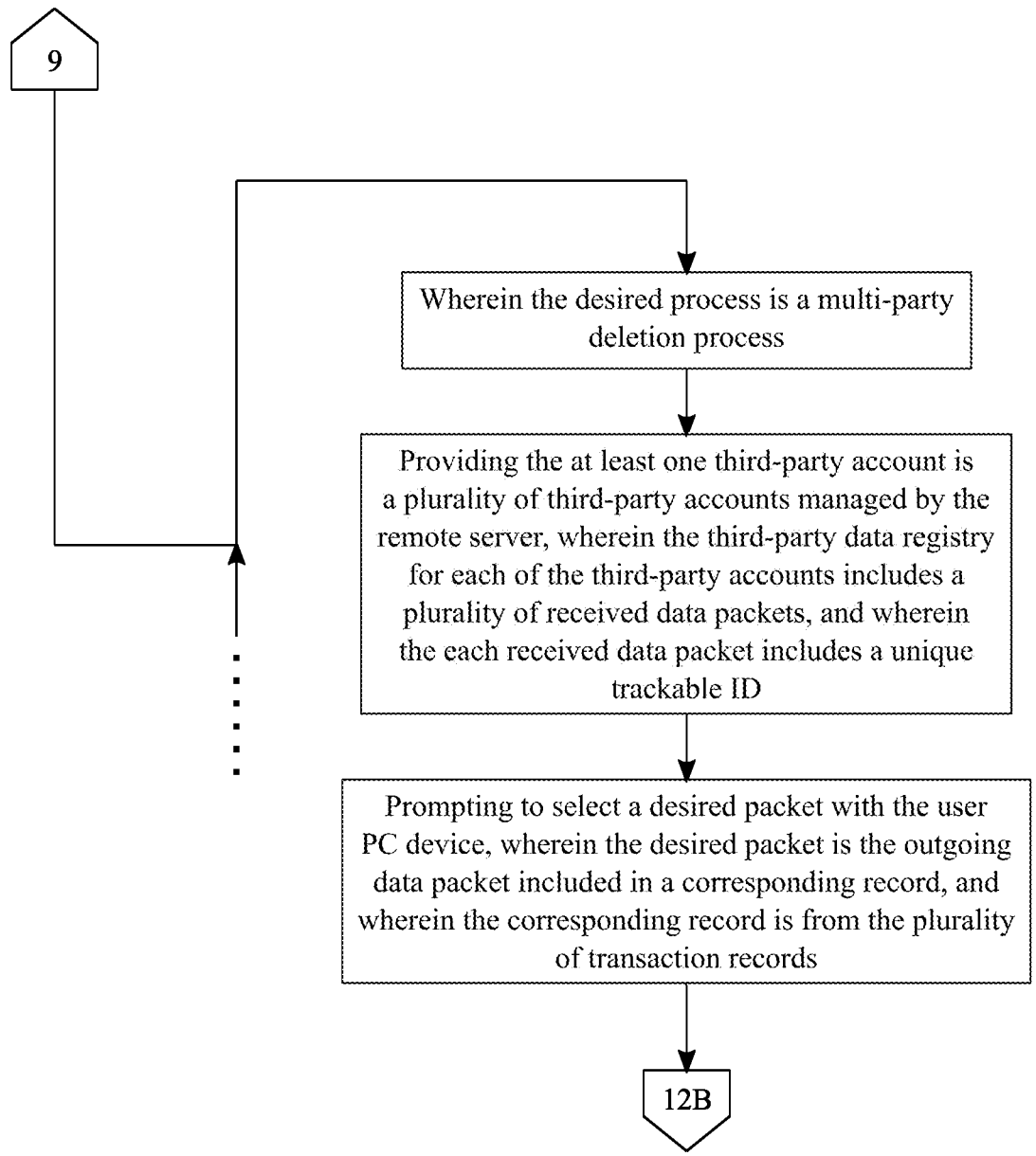
FIG. 12a is flowchart illustrating a sub-process for executing a multi-party deletion process using the method of the present invention.
Figure 12B:
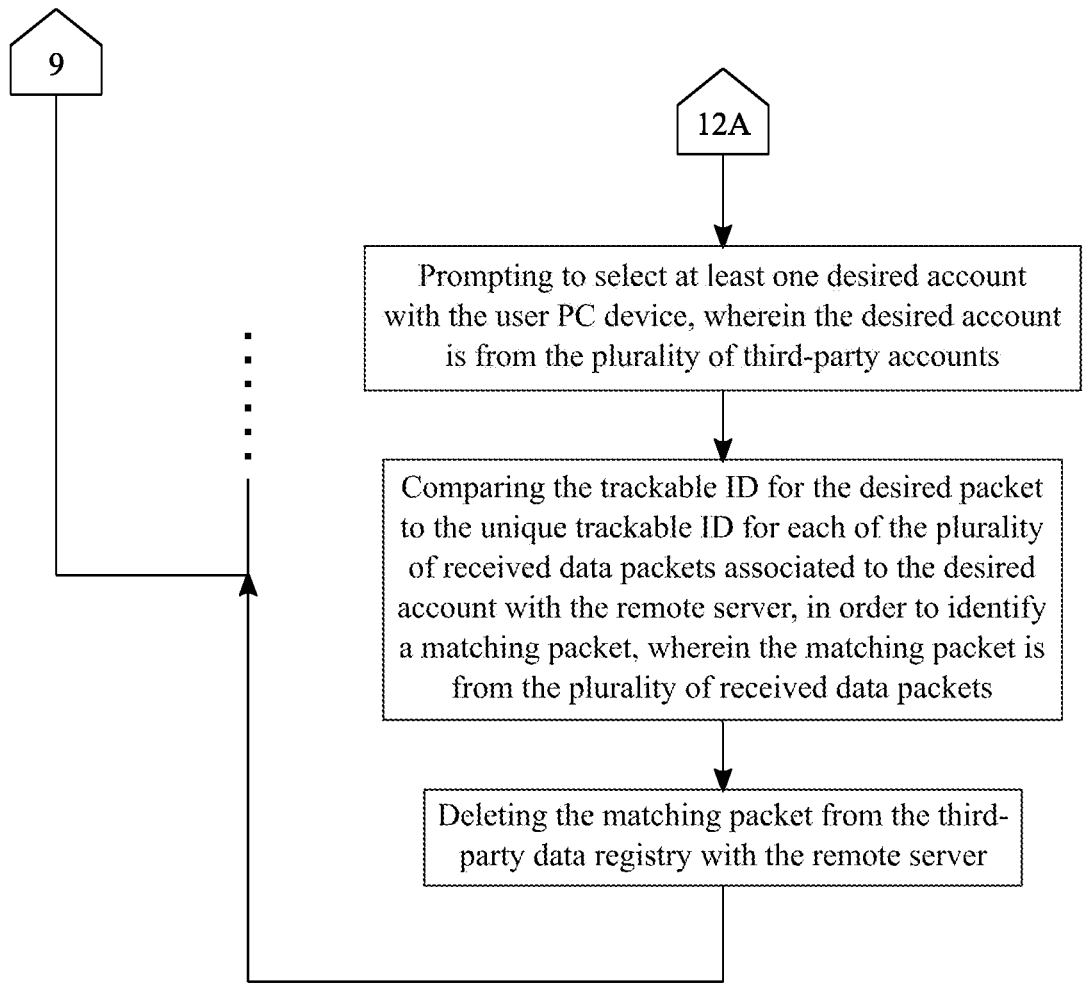

Referring to FIG. 12a and FIG. 12b, a separate sub-process is executed when the desired process is a multi-party deletion process. The multi-party deletion process enables the user to delete all copies of a specific piece of user data that are held by a plurality of third-party accounts. The system for executing the multi-party deletion process provides a plurality of received data packets included in the third-party data registry for each of the plurality of third-party accounts, again each received data packet includes a unique trackable ID. The multi-party deletion process begins by prompting to select a desired packet with the user PC device. The user is given the option to select one or more outgoing data packets that have been transferred to the plurality of external entities and mark them for deletion. Specifically, desired packet is the outgoing data packet included in a corresponding record, where the corresponding record is from the plurality of transaction records. The multi-party deletion process continues by prompting to select at least one desired account from the plurality of third-party accounts with the user PC device. Accordingly, the user is given the option to choose one or more third-party accounts from which the desired packet will be deleted. The multi-party deletion process continues by comparing the trackable ID for the desired packet to the unique trackable ID for each of the plurality of received data packets associate to the desired account with the remote server, in order to identify a matching packet from the plurality of received data packets stored in the third-party data registry. The targeted deletion process concludes by deleting the matching packet from the third-party data registry with the remote server. Accordingly, the user is given the freedom to delete user data a plurality of third-party accounts, simultaneously.

Figure 13:
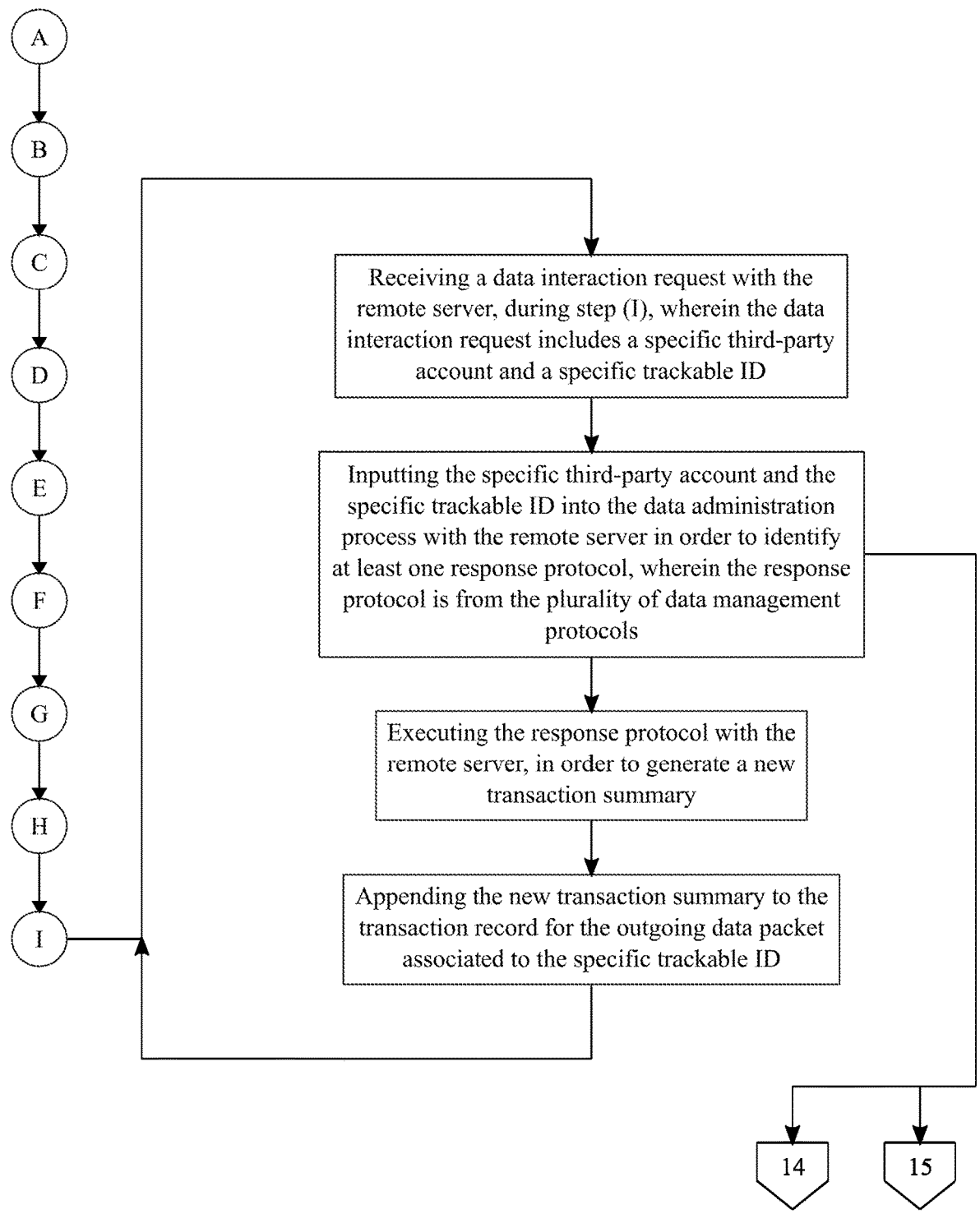
FIG. 13 is flowchart illustrating a sub-process for executing a response protocol using the method of the present invention.

Referring to FIG. 13, the method of the present invention is designed to mediate data communication between the user profile and the external entity. To that end the method of the present invention is designed to identify the correct sub-processes to execute when a data request is received from the external entity. The method for identifying the correct sub-process begins by receiving a data interaction request with the remote server, during Step I. The data interaction request is a message requesting access to a specific piece of user data. Additionally, the data interaction request includes a specific third-party ID and a specific trackable ID. Specific third-party ID denotes the third-party account that sent of the data interaction request. The specific trackable ID is the trackable ID for a piece of user data stored in the user data registry. The sub-process continues by inputting the specific third-party ID and the specific trackable ID into the data administration process with the remote server, in order to identify at least one response protocol, from the plurality of data management protocols. Similar to the overall method of the present invention, this sub-process continues by executing the response protocol with the remote server, in order to generate a new transaction summary. The new transaction summary is a record of the transaction carried out during the response protocol. The sub-process concludes by appending the new transaction summary to the transaction record for the outgoing data packet associated to the specific trackable ID. Thus, the sub-process updates the user data registry to reflect the routines completed during the response protocol.

Figure 14:
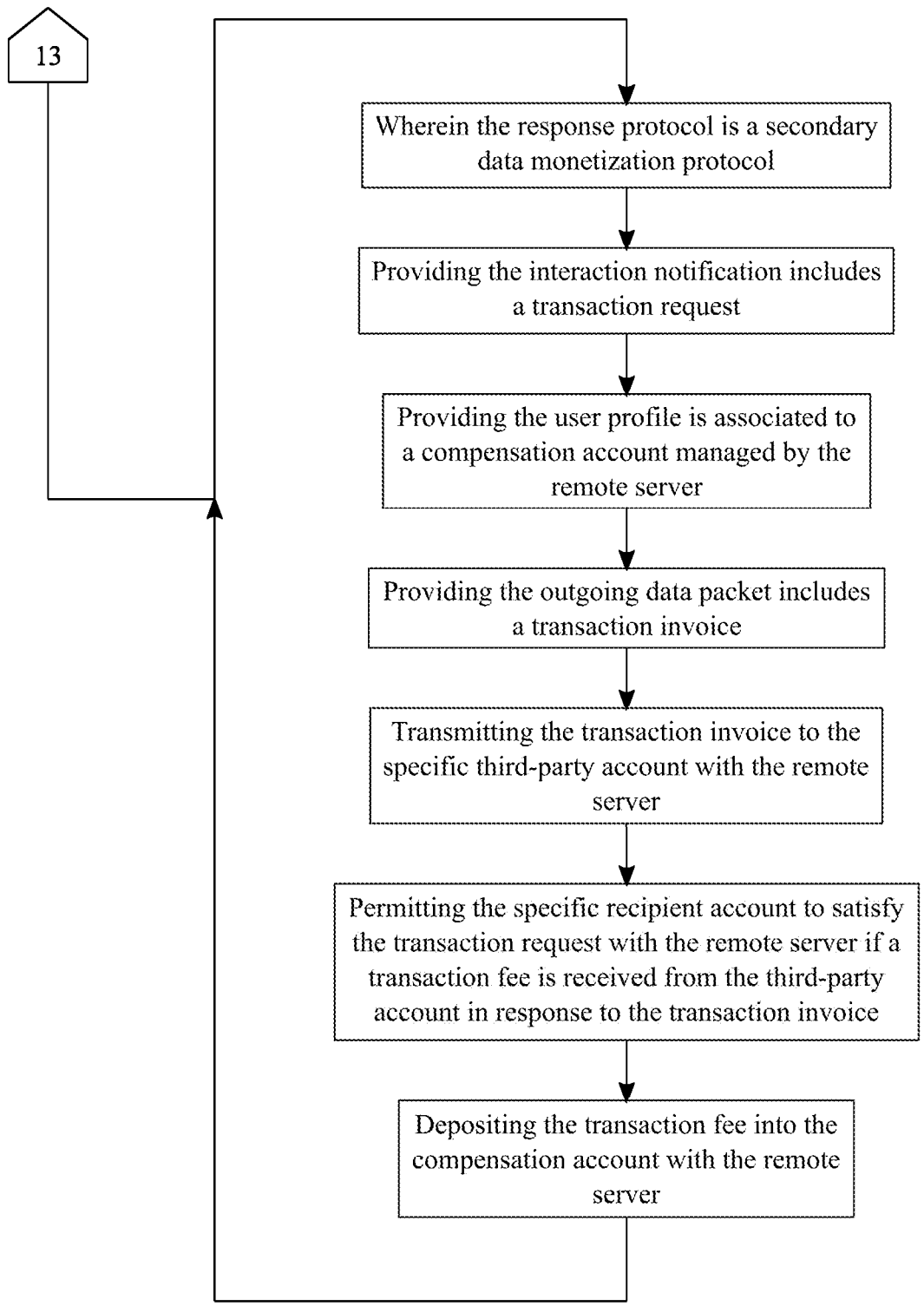
FIG. 14 is flowchart illustrating a sub-process for executing a secondary data monetization protocol using the method of the present invention.

Referring to FIG. 14, a separate sub-process is executed when the response protocol is a secondary data monetization protocol. The secondary data monetization protocol is designed to perform financial transactions that enable the external entity to access user data. The secondary data monetization protocol begins by transmitting the transaction invoice to the specific third-party account with the remote server. The secondary data monetization protocol continues by the specific recipient account to satisfy the transaction request with the remote server if a transaction fee is received from the third-party account in response to the transaction invoice. The secondary data monetization process concludes by depositing the transaction fee into the compensation account with the remote server. As a result, the method of the present invention enables the user to be compensated for allowing the external entity to access or interact with the user data.

Figure 15:
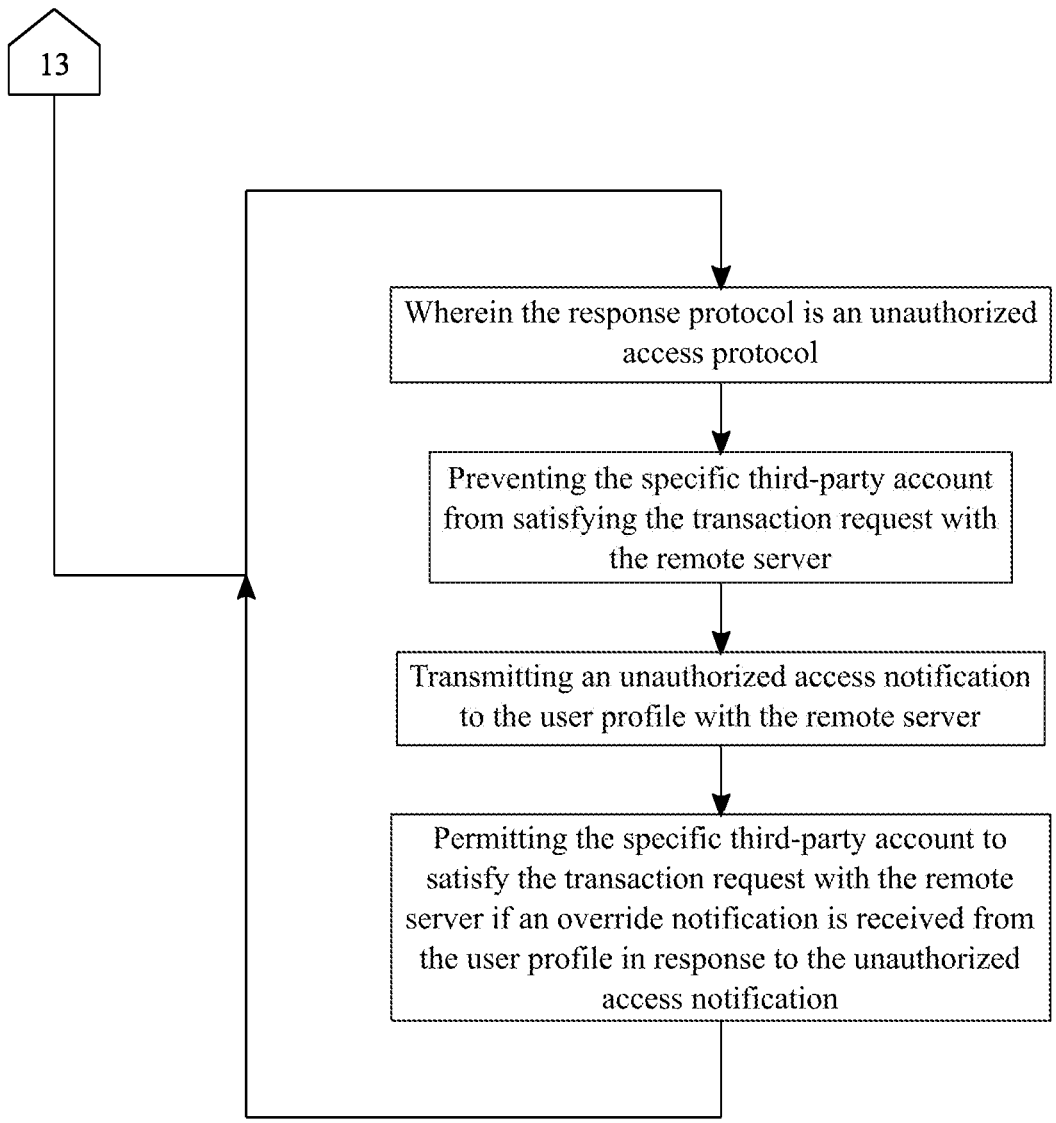
FIG. 15 is flowchart illustrating a sub-process for executing an unauthorized access protocol using the method of the present invention.

Referring to FIG. 15, a separate sub-process is executed when the response protocol is an unauthorized access protocol. The unauthorized access protocol is executed when the remote server receives a data interaction notification from an external entity that is not authorized to access a requested piece of user data. The unauthorized access protocol begins by preventing the specific third-party account from satisfying the transaction request with the remote server. Thus, once the remote server classifies the third-party account as unauthorized the method of the present invention prevents the unauthorized account from accessing user data. The unauthorized access protocol continues by transmitting an unauthorized access notification to the user profile with the remote server. The unauthorized access notification alerts the user to the presence of an unwanted data request. And gives the user the option to override the remote server and permit the previously unauthorized account to access the requested user data. Thus, the unauthorized access protocol continues by permitting the specific third-party account to satisfy the transaction request with the remote server if an override notification is received from the user profile in response to the unauthorized access notification.

In some embodiments all user data transactions are mediated by a user control device. The user control device may function as a locking system that prevents all access to user data while engaged. Additionally, the user control device may function as a repository for all the user data that is stored in the user data registry. Further, the user control device is a computing device capable of performing the processes required to execute the method of the present invention. In some embodiments the present invention is used to manage the data transactions for a corporate entity. Th these embodiments multiple user accounts are associated to a single corporate profile. The method of the present invention then implements the appropriate protocols as defined by an administrator of the corporate profile. This embodiment enables the administrator to easily audit user activity and ensure company data is being properly used.

Although the invention has been explained in relation to its preferred embodiment, it is to be understood that many other possible modifications and variations can be made without departing from the spirit and scope of the invention as hereinafter claimed.

SUPPLEMENTAL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of a plurality of embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein. The present disclosure includes many aspects and features. Moreover, while many aspects and features relate to, and are described in the context of facilitation of automatic generation of documents providing an explanation of digital processes, custom programs, models, and algorithms in computational systems, embodiments of the present disclosure are not limited to use only in this context.

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The data capture component may capture the key elements, source code, script, structures, metadata (author, person details, location, and date), models, algorithms, data utilized, systems etc. The data capture component may also pick up information based on the usage and distribution of data in the delivery process. The data collected may be useful because it would provide the user with the full disclosure needed to monitor where, and how their personal information may be used. All of the data may be stored in an entity specific blockchain or other methods including but not limited to wedged cards.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Automated data collecting may be initiated across a multitude of platforms allowing the present invention to discover and document data from the point of entry. The registry system component may automatically generate reports on a specific data set which may include identifying information on what the data set may be, information about the current user of the dataset, what the data may be used for, human intervention points and decisions, algorithms and models, dependencies and relationships, and version history.

Blockchain storage component may be the default ledger where all the data may be stored in. If an organization is not ready to adopt blockchain, alternative storage mechanisms can be used. System integration component may include the ability to call (if desired) for the usage of items stored in the blockchain or alternate storage. Alert & Communication component may facilitate notifications of changes and newly created items.

By way of non-limiting example, the online platform for implementing a data transaction processing system may be hosted on a centralized server, such as, for example, a cloud computing service. The centralized server may communicate with other network entities, such as, for example, mobile devices (such as a smartphone, a laptop, a tablet computer etc.), other electronic devices (such as desktop computers, gaming consoles, voice-activated devices (such as Amazon Alexa, Google Home), server computers etc.), and databases (such as databases related to scientific literature and social media accounts) over a communication network, such as, but not limited to, the Internet. Further, users of the online platform may include relevant parties such as, but not limited to users, employees, employers, and administrators. Accordingly, in some instances, electronic devices operated by numerous parties may be in communication with the online platform.

A user, such as the relevant parties, may access online platform through a web-based software application or browser. The web-based software application may be embodied as, for example, but not be limited to, a website, a web application, a desktop application, and a mobile application compatible with a computing device.

According to some embodiments, the online platform may be configured to facilitate data collection, transfer and transaction, providing an explanation of digital processes, custom programs, models, and algorithms in computational systems. The computational systems may be used by one or more business establishments, such as firms, banks, and so on, and may include a plurality of components, which may be configured to perform one or more tasks through one or more digital processes, custom programs, models, algorithms, AI, RPA, machine learning, and so on.

Accordingly, the online platform 100 may be configured to communicate with one or more user devices. The plurality of user devices may include one or more mobile devices such as, but not limited to, smartphones, computer tablets, laptops, and so on. The one or more user devices may include a communication device configured to communicate over a communication network such as, but not limited to, a cellular network, a satellite network, a personal area network, Bluetooth, Internet and so on. Further, the online platform 100 may be configured to communicate with one or more computational systems, and one or more components associated with the one or more computational systems, such as processing devices, storage devices, and so on.

Further, the online platform may receive technical configuration from a connected computational system. The technical configuration may be related to the connected computational system and may include information about one or more hardware and software components of the connected computational system, which may be configured to perform various actions. The plurality of hardware components may include a plurality of storage devices, which may be configured for the storage of data in numerous forms, one or more storage controllers, which may be configured to combine one or more storage device components into one or more logical units for the purposes of data redundancy, performance improvement, capacity, and so on, one or more processors, which may be configured to process data in one or more forms, one or more communication devices, which may be configured to communicate with one or more components, or computational systems over one or more networks, and so on. Further, the one or more software components may include one or more programs, or tools, which may be configured to perform one or more functions using the one or more hardware components, through one or more algorithms, models, and/or machine learning.

A user, such as the one or more relevant parties, may access online platform 100 through a web-based software application or browser. The web-based software application may be embodied as, for example, but not be limited to, a website, a web application, a desktop application, and a mobile application compatible with a computing device.

The present invention discloses a method to collect and monitor the data created by a user. Accordingly, the present invention comprises a registry system, a delivery system, a remote data deletion/lock module, an alert module, and a wrapper. The method includes installing the application on various devices including but not limited to cell phones, tablets, gaming systems, computers, or any internet connected device. The sequence of operational steps monitors any data created related to the user. In addition, the present invention is able to track how the data collected is used, and if it is submitted or collected by third party apps or unauthorized applications.

The registry module component may enable users to register and understand the complex data, such as what details are included, personal information, usage, etc. The registry module may provide an overview illustration of data and any other associated components. The registry module may contain a plurality of algorithms that discover and log all possible data collected by software and services with which the user interacts with. Furthermore, the registry system may also log each transaction that takes place where the user's data is involved, by logging each item and facilitates the processing and delivery of the data to the receiving party. The registry system may further be used by the user to revoke the right of use or to reclaim possession of their data similar to revoking a credit card transaction, however other means of achieving the same result may be implemented and as such the present invention is not limited to this particular option.

Subsequently, the delivery system moves the data from each respective party that interacts with the present invention. Data may be used in a variety of different ways, and as such it may also be exchanged through various methods and platforms.

Furthermore, an additional critical step integrated in the present invention, is the remote data deletion/lock module. This particular feature allows users to remotely delete or lock their collected data via a simple command using the interactive application of the present invention. Furthermore, the user is able to sort through the data transaction history and apply the features of the remote data deletion/lock module to previous transaction, that may have been completed without authorization thus stopping the receiving party.

In further embodiments the present invention may further be used by companies or different entities, that provide the data they collect to customers, employees, businesses. Accordingly, companies that aim to limit how, where, and when the data is used may implement the features integrated by the registry system at a larger scale. Currently the data is provided freely, and there are no specific mechanisms that a company may use to ensure the data is used only for the purpose it was intended. In an alternative embodiment, users further have the option to set a fee, that grants the service the right to use the data. Furthermore, the user has the option to elect how the content history of the data is managed. A critical feature of the present invention is the ability of to track the context of the data provided within a website or a web application including but not limited to lies, social media posts, financial transactions, online shopping, and history of visited websites.

The registry module accomplishes the tasks of the present invention by comprising one or a plurality of data registries. The data registry is able to track data from the creation of the data to the delivery, across multiple parties and entities, regardless if the delivery is purposeful or not. In addition, the present invention may be used as an intermediary for delivery. The present invention is able to assign a unique identification element that is directly associated with the data as it is being exchanged. Furthermore, the identification element may also act as a receiver and may also obtain instructions to delete itself or lock the data altogether if the transaction is revoked by the user.

Accordingly, the method may further comprise a plurality of steps starting with a data collection and account transaction processing. Next, the user is required to register the data widget card. The data widget card may or may not comprise a magnetic band, or chip where the data would be recorded and saved. Each widget card will receive a unique identified know as a secure ID, of the form of an encrypted cypher. Each device receives an individual ID installed on the respective widget card, and as such it can only be used by the identified person on the identified device. Furthermore, the widget card may either be in the form of a physical device, or in the virtual form, and as such the present invention is not limited to a specific embodiment. In addition, the widget card may be in the form of a ledger, with the ability to inform and notify the user of any misuse of their personal data. The present invention further integrates features such as the right to be forgotten. Users are able to decide entirely how the data is managed, and the registry system further comprises the option to purge any existing data and maintain a personal right to privacy. In the unfortunate event that the present invention is lost or stolen, the widget card can self-destroy while notifying the user via an alert. A self-destruction feature is also integrated into the device as a critical last resort that would allow users to interrupt any data collection processes effective immediately.

Furthermore, the widget card can automatically alert the central server of any possible misuse and provide any collected forensic evidence which may be useful for law enforcement investigation. As the user browses the web, regardless if data is collected actively or passively, the widget card contacts the processing server to record the transaction Every time a new transaction is recorded, the user account history is updated with a unique transaction identifier. The user receives a notification that a new transaction has been conducted. In the event that a user decides to revoke a transaction the user may access the account history via a mobile application. A list with all the transactions recorded are shown, and the mobile application further integrates features such as the ability to filter and sort through the list. The data collector is notified as the user clicks the link to revoke the transaction depending on the scenario where the data process is used. If a costumer of the data process received the request to revoke the transaction, the link is received by the mobile app server which further tracks where the data is stored in the organization and removes all evidence. A notification is sent to the processor, that acknowledges the completion of the process.

Furthermore, in an additional embodiment the remote signal is sent to the data collector network to be sent to the data element. If a request for revoking a transaction is received by the data element, the data element self purges, and transmits a notification back to the processor. When the present invention is integrated into the organizational structure of a company, the company provided processing server assigns a unique to processor ID. If the company transfers data elements to other entities, the processing server may be used to package the data using the wrapper module or any appropriate embedded element that contain a marker. Further the method may include, a marker of where, when and by whom the wrapper can be used.

Further, the method may include an expiration date, with a deadline where the data automatically is removed at a given date.

Further, the method may include the ability to remotely wipe the data.

Further, the method may include a unique data transaction identifier.

Further, the method may include a data receiver or processor service that register with the company that will provide the data. The processing server receives the data to be provided, and further implements instructions via the wrapper or other embedded indicators.

Further the present invention alerts or wipes the data if the device is tampered with, or if prohibited actions are attempted. In addition, the user maintains full control and as such the data may also be wiped if instructed via a service request.

In an additional embodiment the present invention may include an option where the user may elect to keep the content history by site and action, either for free or for a price. A key feature is to track the context of the data provided within a website or a web application, including likes, social media posts, financial transactions, purchases, websites visited etc. Further the method may include the option to set a fee as a tradeoff, allowing the user to sell the rights for a specific duration of time to an individual or entity.

The method of operation may include a feature that gives the users the ability to set a fee and sell the exclusive or shared use of their data, including but not limited to demographic data. Additionally, a trading market for data may be implemented, where data elements are units that may be bought and/or sold as a secondary market. Business and academia would be able to buy data on the market directly from individuals that sell their rights or from intermediary buyers. The present invention allows users to fully manage their data and control the aspects of their data to include specific demographic information designed to enhance the value of the data. Furthermore, the user is able to remove or withhold personal information when it comes to the data they want to make available for sale.

Currently there are various ways for companies to exploit the financial benefits of collected data. The present invention however is designed to allow individuals to specifically monetize their own data, either by selling or renting it as opposed to the companies that collect it. In addition, the data may be traded between individuals in a peer to peer type system, creating a dedicated market where users are able to obtain the best possible value out of their own data. In addition, if the user chooses to retract their data altogether they have the option to do so. Furthermore, it enables companies to purchase data from individuals to search attributes about the individual by looking at specific identifiers within the collected data. After a buyer obtains the right to control the data, they have the option to sell to another individual or company as a bundle, by grouping similar data purchased from another source. An important feature of the present invention is the ability to capture data at the initial point of entry.

A possible method of operation when the present invention is implemented at an organizational level is to first register the company with the present invention. Then the company is provided with a processing server that assigns a unique identifier. If the provided data elements will be send to other entities, then the processing server is used to package data with the wrapper feature. First a marker is introduced to the data that collects information about where, when, and by whom the data can be used. Further, if required an expiration date is added to the wrapper. In addition, the wrapper maintains the ability to remotely wipe data. Last but not least each transaction is assigned a unique identifier.

Technical configuration may be related to one or more computational systems, and may include information about one or more hardware, and one or more software components of the one or more computational systems, which may be configured to perform one or more actions. The plurality of hardware components may include one or more storage devices, which may be configured for the storage of data in various forms, one or more storage controllers, which may be configured to combine one or more storage device components into one or more logical units for the purposes of data redundancy, performance improvement, capacity, and so on, one or more processors, which may be configured to process data in one or more forms, one or more communication devices, which may be configured to communicate with one or more components, or computational systems over one or more networks, and so on. Further, the one or more software components may include one or more programs, or tools, which may be configured to perform one or more functions using the one or more hardware components, through one or more algorithms, models, and/or machine learning.

Further, the method may include a step of communicating, using a communication device, with a connected computational system, and discovering a technical configuration of the connected computational system. The connected computational system may include one or more components, which may communicate with one another to perform one or more tasks that the computational system may be configured to perform. Accordingly, the technical configuration of the computational system may be discovered. In an instance, the technical configuration may be discovered by querying one or more appropriate modules of the computational system, and retrieving appropriate information related to one or more connected components. For instance, the firmware of the computational system may be queried, and information about one or more hardware components, and associated configurations thereof may be received. Accordingly, a technical configuration of the system may be discovered. The technical configuration may include information about one or more hardware, and one or more software components of the one or more computational systems, which may be configured to perform one or more actions. The one or more hardware components may include one or more storage devices, which may be configured for the storage of data in one or more forms, one or more storage controllers, which may be configured to combine one or more storage device components into one or more logical units for the purposes of data redundancy, performance improvement, capacity, and so on, one or more processors, which may be configured to process data in one or more forms, one or more communication devices, which may be configured to communicate with one or more components, or computational systems over one or more networks, and so on. Further, the one or more software components may include one or more programs, or tools, which may be configured to perform one or more functions using the one or more hardware components, through one or more algorithms, models, and/or machine learning.

Further, the method may include a step of monitoring, tracking and managing the data, using the processing device, the technical configuration of the connected computational system, and detecting a change in the technical configuration. The change in the technical configuration may be detected by the addition or removal of one or more components. For instance, if one or more hardware components have been added, the hardware components may be configured to provide added functionality and may be configured to perform one or more additional actions. Accordingly, the one or more additional hardware components may be monitored, and a resulting change in the technical configuration may be determined. Further, if one or more software components may have been added, the one or more software components may execute the one or more additional actions through one or more algorithms. Accordingly, the one or more additional software components may be analyzed, through analysis of a source code, through one or more developer comments, or through one or more underlying algorithms, and a resulting change in the technical configuration may be determined.

Further, the method may include a step of storing, using a storage device, the collected data. The collected data may be stored on a storage device. In some embodiments, the one or more translated documents may be stored using blockchain technology.

A system consistent with an embodiment of the disclosure may include a computing device or cloud service, such as computing device. In a basic configuration, computing device may include at least one processing unit and a system memory. Depending on the configuration and type of computing device, system memory may comprise, but is not limited to, volatile (e.g. random-access memory (RAM)), nonvolatile (e.g. read-only memory (ROM)), flash memory, or any combination. System memory may include operating system, one or more programming modules, and may include a program data. Operating system, for example, may be suitable for controlling computing device's operation. In one embodiment, programming modules 506 may include image processing module, machine learning module and/or image classifying module. Furthermore, embodiments of the disclosure may be practiced in conjunction with a graphics library, other operating systems, or any other application program and is not limited to any particular application or system.

Computing device may have additional features or functionality. For example, computing device may also include additional data storage devices (removable and/or non-removable) such as, for example, magnetic disks, optical disks, or tape. Such additional storage may include a removable storage and a non-removable storage. Computer storage media may include volatile and nonvolatile, removable and non-removable media implemented in any method or technology for storage of information, such as computer-readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device. Any such computer storage media may be part of device. Computing device may also have input device(s) such as a keyboard, a mouse, a pen, a sound input device, a touch input device, a location sensor, a camera, a biometric sensor, etc. Output device(s) such as a display, speakers, a printer, etc. may also be included. The aforementioned devices are examples and others may be used.

Computing device may also contain a communication connection that may allow device to communicate with other computing devices, such as over a network in a distributed computing environment, for example, an intranet or the Internet. Communication connection is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory, including operating system. While executing on processing unit, programming modules (e.g., application such as a media player) may perform processes including, for example, one or more stages of methods, algorithms, systems, applications, servers, databases as described above. The aforementioned process is an example, and processing unit may perform other processes. Other programming modules that may be used in accordance with embodiments of the present disclosure may include sound encoding/decoding applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

What is claimed is:

1. A method for personal data administration in a multi-actor environment, the method comprising the steps of:
   (A) providing at least one data administration process managed by at least one remote server;
   (B) providing at least one user profile managed by the remote server, wherein the user profile is associated to at least one user personal computing (PC) device, wherein the user profile includes a plurality of data management protocols, and wherein the user profile is associated to a user transactional history registry;
   (C) providing at least one third party account managed by the remote server, wherein the third-party account is associated to a third-party identifier (ID), and wherein the third-party account is associated to a third-party data registry;
   (D) receiving a data transmission notification from the user profile with the remote server, wherein the data transmission notification includes at least one data packet and at least one third-party ID;
   (E) inputting the third-party ID and the data packet into the data administration process with the remote server in order to identify at least one appropriate protocol, wherein the appropriate protocol is from the plurality of data management protocols;
   (F) executing the appropriate protocol with the remote server in order to generate at least one outgoing data packet and a transaction summary, wherein the outgoing data packet includes a trackable ID;
   (G) appending a transaction record to the user transactional history registry with the remote server, wherein the transaction record includes the outgoing data packet and the transaction summary;
   (H) transmitting the outgoing data packet to the third-party account with the remote server;
   (I) continually monitoring the outgoing data packet with the remote server;
   (J) receiving an interaction notification from the third-party account with the remote server, wherein the interaction notification includes the third-party ID and a data request;
   (K) searching with the user PC device for the data packet that satisfies the data request;
   (L) formatting the third-party ID and the data packet into the data transmission notification with the user PC device, before step (D);
   providing each of the plurality of data management protocols includes a third-party ID list and a protocol classification token;
   comparing the third-party ID to the third-party ID list for each of the plurality of data management protocols with the remote server in order to identify at least one first possible protocol, wherein the at least one first possible protocol is from the plurality of data management protocols;
   comparing the packet classification token to the protocol classification token for each of the plurality of data management protocols with the remote server in order to identify at least one second possible protocol wherein the at least one second possible protocol is from the plurality of data management protocols;
   comparing the at least one first possible protocol to the at least one second possible protocol with the remote server in order to identify at least one overlapping protocol, wherein the overlapping protocol is included in the at least one first possible protocol and the at least one second possible protocol; and
   designating an overlapping protocol as the appropriate protocol with the remote server.

2. The method as claimed in claim 1 comprising the steps of:
   providing the user profile is associated to a plurality of data permissions catalogues, and wherein each data permissions catalog includes at least one account ID;
   comparing the third-party ID to the account ID for each of the plurality of data permissions catalogues with the remote server in order to identify at least one matching catalogue, wherein the matching catalogue is from the plurality of data permissions catalogues; and
   entering a denial of service process if the matching catalogue is not identified, before step (K).

3. The method as claimed in claim 1 comprising the steps of:
   wherein the appropriate protocol is a primary data monetization protocol;
   providing the user profile is associated to a compensation account managed by the remote server;
   providing the data packet includes a transaction invoice;
   transmitting the transaction invoice to the third-party account with the remote server;
   designating the data packet as the outgoing data packet with the remote server;
   transmitting the outgoing data packet to the third-party account with the remote server, during step (H), if a transaction fee is received from the third-party account in response to the transaction invoice; and
   depositing the transaction fee into the compensation account with the remote server.

4. The method as claimed in claim 1 comprising the steps of:
   wherein the appropriate protocol is a data anonymization protocol;
   providing the data packet includes personal identifiable information;

removing the personal identifiable information from the data packet with the remote server in order to generate an anonymized data packet; and designating the anonymized data packet as the outgoing data packet with the remote server.

5. The method as claimed in claim 1 comprising the steps of:

wherein the appropriate protocol is a data wrapper protocol;

integrating at least one hardcoded command and at least one tamper-evident signature into the data packet with the remote server; and combining the data packet and the trackable ID into the outgoing data packet with the remote server.

6. The method as claimed in claim 1 comprising the steps of:

providing a plurality of data control processes managed by the remote server;

prompting to select a desired data control process with the user PC device, wherein the desired process is from the plurality of data control processes; and executing the desired process during step (I).

7. The method as claimed in claim 6 comprising the steps of:

wherein the desired process is a general overview process;

identifying a component configuration of the user PC device with the remote server;

formatting the user transactional history registry to correspond to the component configuration with the remote server; and displaying the formatted user transactional history registry with the user PC device.

8. The method as claimed in claim 6 comprising the steps of:

wherein the desired process is a targeted deletion process;

providing the user transactional history registry includes a plurality of transaction records;

providing the third-party data registry includes a plurality of received data packets, wherein the each received data packet includes a unique trackable ID;

prompting to select at least one desired packet with the user PC device, wherein the desired packet is the outgoing data packet included in a corresponding record, and wherein the corresponding record is from the plurality of transaction records;

comparing the trackable ID for the desired packet to the unique trackable ID for each of the plurality of received data packets with the remote server in order to identify a matching packet, wherein the matching packet is from the plurality of received data packets; and deleting the matching packet from the third-party data registry with the remote server.

9. The method as claimed in claim 6 comprising the steps of:

wherein the desired process is a multi-party deletion process;

providing the at least one third-party account is a plurality of third-party accounts managed by the remote server, wherein the third-party data registry for each of the third-party accounts includes a plurality of received data packets, and wherein the each received data packet includes a unique trackable ID;

prompting to select at least one desired packet with the user PC device, wherein the desired packet is the outgoing data packet included in a corresponding record, and wherein the corresponding record is from the plurality of transaction records;

prompting to select at least one desired account with the user PC device, wherein the desired account is from the plurality of third-party accounts;

comparing the trackable ID for the desired packet to the unique trackable ID for each of the plurality of received data packets associated to the desired account with the remote server in order to identify a matching packet, wherein the matching packet is from the plurality of received data packets; and deleting the matching packet from the third-party data registry with the remote server.

10. The method as claimed in claim 1 comprising the steps of:

receiving a data interaction request with the remote server, during step (I), wherein the data interaction request includes a specific third-party ID and a specific trackable ID;

inputting the specific third-party ID and the specific trackable ID into the data administration process with the remote server in order to identify at least one response protocol, wherein the response protocol is from the plurality of data management protocols;

executing the response protocol with the remote server in order to generate a new transaction summary; and appending the new transaction summary to the transaction record for the outgoing data packet associated to the specific trackable ID.

11. The method as claimed in claim 10 comprising the steps of:

wherein the response protocol is a secondary data monetization protocol;

providing the interaction notification includes a transaction request;

providing the user profile is associated to a compensation account managed by the remote server;

providing the outgoing data packet includes a transaction invoice;

transmitting the transaction invoice to the specific third-party account with the remote server;

permitting the specific recipient account to satisfy the transaction request with the remote server if a transaction fee is received from the third-party account in response to the transaction invoice; and depositing the transaction fee into the compensation account with the remote server.

12. The method as claimed in claim 10 comprising the steps of:

wherein the response protocol is an unauthorized access protocol;

preventing the specific third-party account from satisfying the transaction request with the remote server;

transmitting an unauthorized access notification to the user profile with the remote server; and permitting the specific third-party account to satisfy the transaction request with the remote server if an override notification is received from the user profile in response to the unauthorized access notification.

* * * * *